US009170922B1

(12) United States Patent
Lachwani et al.

(10) Patent No.: US 9,170,922 B1
(45) Date of Patent: Oct. 27, 2015

(54) REMOTE APPLICATION DEBUGGING

(71) Applicant: Google Inc., Mountain View, CA (US)

(72) Inventors: Manish Lachwani, Sunnyvale, CA (US); Jay Srinivasan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/165,452

(22) Filed: Jan. 27, 2014

(51) Int. Cl.
*G06F 9/44* (2006.01)
*G06F 11/36* (2006.01)

(52) U.S. Cl.
CPC .................... *G06F 11/3664* (2013.01)

(58) Field of Classification Search
None
See application file for complete search history.

(56) References Cited

U.S. PATENT DOCUMENTS

| 4,953,084 | A |   | 8/1990 | Meloy et al. |
|-----------|---|---|--------|--------------|
| 5,630,049 | A | * | 5/1997 | Cardoza et al. ................ 714/25 |
| 5,689,684 | A | * | 11/1997 | Mulchandani et al. ......... 703/23 |
| 6,131,188 | A |   | 10/2000 | Goebel |
| 6,145,122 | A |   | 11/2000 | Miller et al. |
| 6,151,701 | A |   | 11/2000 | Humphreys et al. |
| 6,324,683 | B1 | * | 11/2001 | Fuh et al. ........................ 717/124 |
| 6,324,684 | B1 | * | 11/2001 | Matt et al. ....................... 717/124 |
| 6,425,122 | B1 | * | 7/2002 | Klingman ........................ 717/124 |
| 6,598,221 | B1 |   | 7/2003 | Pegatoquet et al. |
| 6,829,733 | B2 |   | 12/2004 | Richardson et al. |
| 7,051,238 | B2 |   | 5/2006 | Gardner et al. |
| 7,418,697 | B2 |   | 8/2008 | Gryko et al. |
| 7,805,707 | B2 |   | 9/2010 | Pouliot |
| 7,870,540 | B2 |   | 1/2011 | Zare et al. |
| 7,991,747 | B1 |   | 8/2011 | Upadhyay et al. |
| 8,370,810 | B2 |   | 2/2013 | Oda |
| 8,479,166 | B2 |   | 7/2013 | Nir-Buchbinder et al. |
| 8,504,987 | B2 |   | 8/2013 | Li et al. |
| 8,671,080 | B1 |   | 3/2014 | Upadhyay et al. |
| 2002/0010710 | A1 |   | 1/2002 | Binnig |
| 2002/0040470 | A1 |   | 4/2002 | Guthrie et al. |
| 2002/0056047 | A1 | * | 5/2002 | Lehman ........................ 713/200 |
| 2002/0166081 | A1 |   | 11/2002 | Richardson et al. |
| 2003/0014736 | A1 | * | 1/2003 | Nguyen et al. ................ 717/129 |
| 2003/0221184 | A1 |   | 11/2003 | Gunjal et al. |
| 2004/0194072 | A1 |   | 9/2004 | Venter |
| 2005/0193264 | A1 | * | 9/2005 | Khan et al. ...................... 714/38 |
| 2005/0216895 | A1 | * | 9/2005 | Tran .............................. 717/127 |
| 2005/0235127 | A1 | * | 10/2005 | Muthiah et al. ............... 711/170 |
| 2005/0273776 | A1 |   | 12/2005 | Guilford |

(Continued)

OTHER PUBLICATIONS

Pyzocha, "Non Final Office Action dated May 13, 2014", U.S. Appl. No. 13/655,667, The United States Patent and Trademark Office, May 13, 2014.

(Continued)

*Primary Examiner* — Chameli Das
(74) *Attorney, Agent, or Firm* — McDonnell Boehnen Hulbert & Berghoff LLP

(57) ABSTRACT

Techniques are described for debugging an application executing on a remote host device. A daemon executing on the host device is instructed, from a server device, to install an application to be debugged and to launch a remote debug module on the host device. A communication session is established between the remote debug module and a local debug module executing on the server device. Debug commands received at the local debug module are communicated to the remote debug module and employed during the debugging of the application. Debug output from the debugging session may be provided to the server device via a mount point into shared memory on the host device.

20 Claims, 8 Drawing Sheets

(56) References Cited

U.S. PATENT DOCUMENTS

| | | | |
|---|---|---|---|
| 2005/0278707 A1 | 12/2005 | Guilford | |
| 2006/0059253 A1 | 3/2006 | Goodman et al. | |
| 2006/0174225 A1* | 8/2006 | Bennett et al. | 717/124 |
| 2006/0195821 A1* | 8/2006 | Vanspauwen et al. | 717/124 |
| 2006/0242709 A1 | 10/2006 | Seinfeld et al. | |
| 2007/0226545 A1* | 9/2007 | Chen | 714/45 |
| 2007/0288644 A1 | 12/2007 | Rojas et al. | |
| 2009/0024981 A1* | 1/2009 | Dye et al. | 717/105 |
| 2009/0150420 A1 | 6/2009 | Towner | |
| 2009/0216979 A1* | 8/2009 | Balasubramanian et al. | 711/163 |
| 2011/0004790 A1* | 1/2011 | Rossmann et al. | 714/27 |
| 2011/0047597 A1 | 2/2011 | Mahaffey et al. | |
| 2011/0289483 A1 | 11/2011 | Williams et al. | |
| 2011/0307871 A1* | 12/2011 | Branda et al. | 717/129 |
| 2012/0131555 A1* | 5/2012 | Hossain et al. | 717/124 |
| 2012/0180109 A1* | 7/2012 | Chen | 726/3 |
| 2012/0260344 A1 | 10/2012 | Maor et al. | |
| 2013/0024835 A1* | 1/2013 | Stein et al. | 717/103 |
| 2013/0060890 A1 | 3/2013 | Lee et al. | |
| 2013/0152047 A1 | 6/2013 | Moorthi et al. | |
| 2013/0159779 A1* | 6/2013 | Mickens | 714/38.14 |
| 2013/0185798 A1 | 7/2013 | Saunders et al. | |
| 2013/0219307 A1* | 8/2013 | Raber et al. | 715/763 |
| 2013/0227636 A1 | 8/2013 | Bettini et al. | |
| 2013/0276061 A1 | 10/2013 | Chebiyyam et al. | |
| 2013/0282892 A1 | 10/2013 | Levi et al. | |
| 2014/0020096 A1 | 1/2014 | Khan et al. | |
| 2014/0082729 A1 | 3/2014 | Shim et al. | |
| 2014/0196013 A1* | 7/2014 | Orr et al. | 717/125 |

OTHER PUBLICATIONS

Pyzocha, "Non Final Office Action dated Sep. 9, 2014", U.S. Appl. No. 13/655,667, The United States Patent and Trademark Office, Sep. 9, 2014.

Seo, et al., "Analysis on maliciousness for mobile applications", 2012 Sixth International Conference on Innovative Mobile and Internet Services in Ubiquitous Computing, IEEE, 2012, pp. 126-129.

"How to setup Java remote debugging in Eclipse", Feb. 25, 2011, <<Retrieved from http://javarevisited.blogspot.com/2011/02/how-to-setup-remote-debugging-in.html>>, 7 pgs.

"Debug Java applications remotely with Eclipse—Use the power of the Eclipse IDE to spread around your Java application debugging", Dec. 9, 2008, <<Retrieved from http://www.ibm.com/developerworks/library/os-eclipse-javadebug/index.html>>, 7 pgs.

"The LLDB Debugger", <<Retrieved from http://lldb.llvm.org/>>, 2 pgs.

"debugserver", Jan. 17, 2014, <<http://iphonedevwiki.net/index.php/Debugserver>>, 4 pgs.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recent%20Publications/TC__2007__TC-0414-1105-1.pdf>.

Chowdhury, "Notice of Allowance dated Jul. 2, 2014", U.S. Appl. No. 13/631,919, The United States Patent and Trademark Office, Jul. 2, 2014.

Coyer, "Non Final Office Action dated Jun. 5, 2014", U.S. Appl. No. 13/721,632, The United States Patent and Trademark Office, Jun. 5, 2014.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

Chowdhury, "Non Final Office Action dated Feb. 13, 2014", U.S. Appl. No. 13/631,919, The United States Patent and Trademark Office, Feb. 13, 2014.

lldb.llvm.org, "The LLDB Debugger", Nov. 14, 2012, available via the Internet at lldb.llvm.org, 2 pgs.

* cited by examiner

REMOTE APPLICATION DEBUGGING

BACKGROUND

With the growing popularity of mobile devices, there is an increasing demand for applications, or apps, to run on such devices. To ensure a substantially positive experience for a user interacting with an application on a device, operations of the application may be tested and analyzed on various devices and under various operating conditions. Results of such testing and analysis may be employed to address bugs or other issues associated with the application, or to improve the performance of the application.

Figure 1:
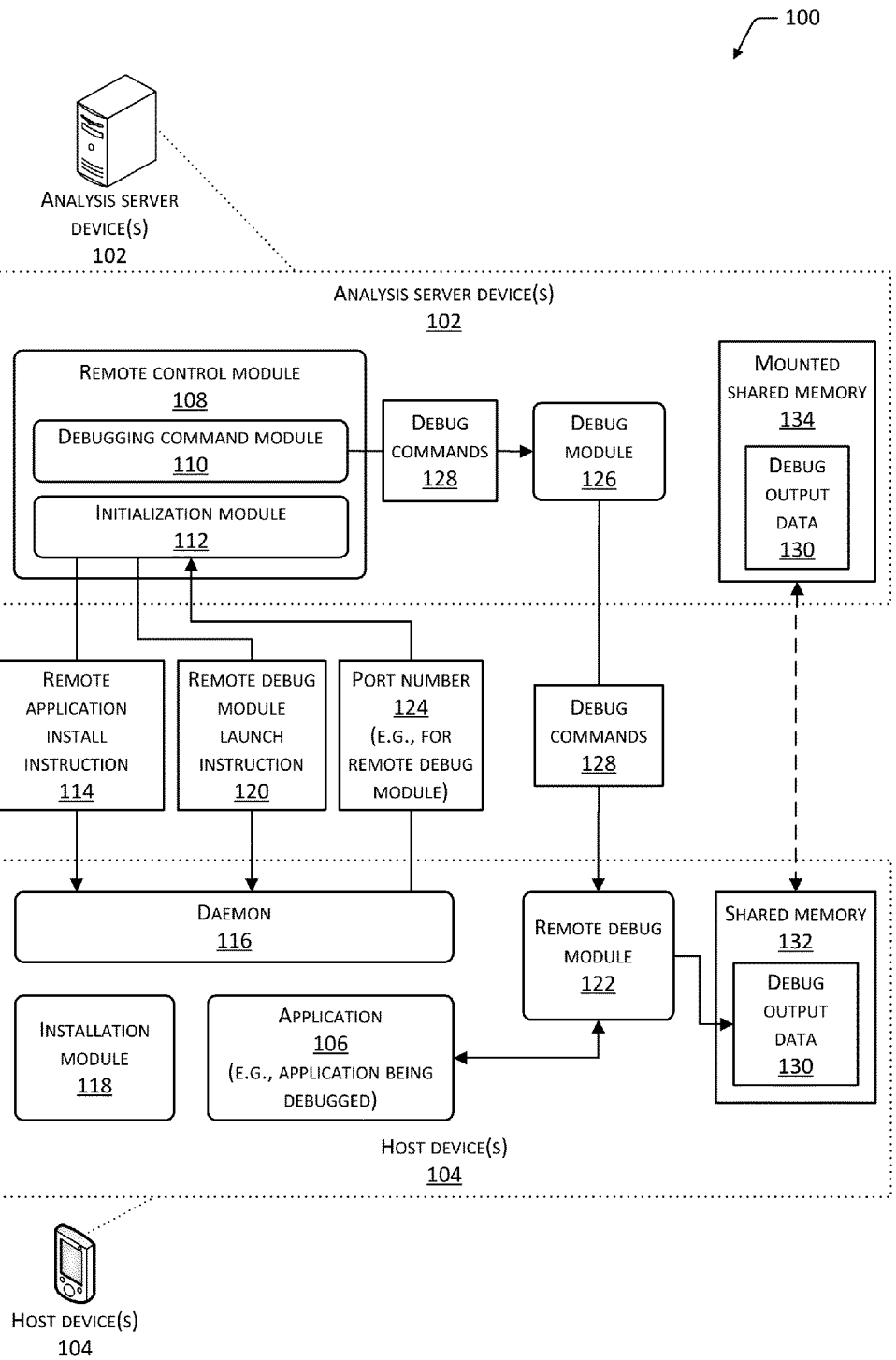
FIG. 1 depicts an environment including one or more analysis server devices that remotely control one or more host devices to enable remote debugging of an application executing on the host device(s).

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for debugging an application executing on a remote host device. Traditionally, a software application may be debugged within a development environment in which the debugger is executing on a same computing device as the application being debugged. In some cases, the installation of a development environment such as an integrated development environment (IDE) on a computing device, and the execution of a debugger on the computing device, may consume memory, processing, and network resources on the computing device. Accordingly, debugging an executing application on a same computing device as the development environment and debugger may alter the performance or functionality of the application being debugged, and may therefore provide an inaccurate measure of the operations of the application on an end-user device or other operational environment. Moreover, in some cases an application may be written to execute on a mobile device, a headless device that lacks a built-in display, or some other computing device that may have limited resources for storage, processing, communication, and so forth. In such cases it may be difficult to debug an application on its target hardware platform using traditional debugging techniques.

Implementations described herein enable an application to be launched using a remote debug module executing on a host device such as a mobile computing device. A local debug module may execute on a server device, and may communicate with the remote debug module via a communication session. During a debugging session, debug commands may be sent from the local debug module to the remote debug module, and the remote debug module may employ the debug commands for debugging the application on the remote host device. Debug commands may include, but are not limited to: launching the application being debugged; setting breakpoints to pause execution of the application; resuming execution following a breakpoint; stepping through instructions in the application; or terminating the execution of the application. Debug commands may also include commands to collect information regarding the state of the application or the host device. Such information may include but is not limited to: values stored in variables, parameters, registers, and program counters of the application; stack traces describing a call stack of the application; screenshots of the user interface (UI) of the application; dumps of the active memory for the application following a crash or failure; or a description of objects instantiated by the application, such as an object hierarchy or view hierarchy of the application.

As used herein, a remote computing device may include any computing device that is physically separated from another (e.g., local) computing device by any distance. A remote computing device may also include any computing device that is in communication with a local computing device over any type of network. In some cases, a remote computing device may be a virtual computing environment, hypervisor, device emulation, virtual machine or another type of virtualization that is executing separately from or within a same computing device as a local computing device, such that the remote computing device and local computing device are logically separate if not physically separate. As used herein, a remote process (e.g., a remote debug module) may be a process that is executing on a remote computing device, such that the remote process may be remote relative to one or more other processes executing on other computing device(s).

The debug commands to collect state information may output the state information to a debug output file on the host device, and the debug output may be provided to the server device that executes the local debug module. Debug commands may be provided manually by a user operating the server device to remotely debug the application on the remote host device. Alternatively, debug commands may be included in a script, program, or other automated process that executes on the server device to remotely debug the application.

In some implementations, the host device on which the application is debugged may be a non-jailbroken host device that substantially conforms to a commercially available, unmodified version of the host device. As described herein, a jailbroken computing device may be a device that has undergone one or more hardware or software modifications to remove or bypass functional limitations in the commercially available version of the device. For example, jailbreaking may include software modifications to gain root or administrative access to the device, enabling the installation of applications or the execution of processes that may otherwise be disallowed on the device. Because jailbreaking includes modifying the software and hardware configuration of a device to modify its functionality, jailbreaking may alter the performance or functionality of an application executing on the device. Some implementations provide for remote debugging of an application executing on a non-jailbroken remote host device, to ensure that the information collected during the debugging session may not be affected by modifications made to jailbreak the host device. Accordingly, some implementations may enable the debugging of an application on the remote host device without gaining root access or administrative access on the host device.

FIG. 1 depicts an environment 100 for remote debugging of an application executing on a host device. The environment 100 may include one or more analysis server device(s) 102 in communication with one or more host device(s) 104. The analysis server device(s) 102 and the host device(s) 104 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. An example of the analysis server device(s) 102 is described further with reference to FIG. 4. An example of the host device(s) 104 is described further with reference to FIG. 5. In some cases, two or more of the analysis server devices 102 may comprise a cluster, cloud, farm, or other grouping of multiple devices that coordinate operations to provide load balancing, failover support, parallel processing capabilities, shared storage resources, or other aspects. In some cases, one or more of the analysis server device(s) 102 and the host device(s) 104 may be a virtual computing environment, hypervisor, device emulation, virtual machine or another type of virtualization that is executing as software on any number of computing devices.

The host device(s) 104 may include computing devices that are substantially mobile, such as smartphones, tablets, electronic book readers, wearable computers, automotive computers, and so forth. The host device(s) 104 may also include computing devices that are substantially less mobile, such as desktop computers, laptop computers, network computers, server computers, mainframe computers, and so forth. In some implementations, the host device 104 may be a software emulation of a physical version of the host device 104. The software emulation may execute on the analysis server device(s) 102, or on other devices.

The host device(s) 104 may include an application 106 that is stored in memory on the host device(s) 104 and executable on the host device(s) 104. In some cases, the application 106 may be an application to be debugged on the host device(s) 104. The application 106 may be any type of software module that is executable on the host device(s) 104, including but not limited to: a game; a social networking application; a word processing or accounting program; a media player, such as an audio or video player; a mapping or navigation application; a communications program such as an email application, a text messaging application, or a text, image, or video chat program; or any other application configured to send, receive, or present information on the host device(s) 104. The application 106 may be written in any compiled or uncompiled (e.g., scripting) programming language, including but not limited to Objective-C, C, C++, Java™, and so forth.

In some implementations, the analysis server device(s) 102 may execute a remote control module 108. The remote control module 108 may include a debugging command module 110 and a initialization module 112. Although FIG. 1 depicts the debugging command module 110 and the initialization module 112 as sub-modules, sub-components, or sub-processes of the remote control module 108, in some implementations either or both of the debugging command module 110 and the initialization module 112 may execute separately from the remote control module 108. The remote control module 108 may perform operations to remotely control processes executing on the host device(s) 104. The remote control operations performed by the remote control module 108, or by other modules of the analysis server device(s) 102, may be performed as described in U.S. patent application Ser. No. 13/619,867, filed on Sep. 14, 2012, titled "Remote Control of a Mobile Device," which is incorporated by reference into this disclosure.

In some implementations, the initialization module 112 may send a remote application install instruction 114 to the host device(s) 104. The remote application install instruction 114 may be received by a daemon 116 executing on the host device 104, and may instruct the daemon 116 to cause the application 106 to be installed on the host device 104. The daemon 116 may include any process, service, or software module that manages operations of hardware or software components on the host device 104. The daemon 116 may execute as a background process, and may be launched as part of the boot process to start the host device 104. In some cases where the operating system (OS) of the host device 104 is a version of iOS™ from Apple™ Corp. of Cupertino, Calif., U.S.A., the daemon 116 may be a version of lockdowned included in iOS™. On receiving the remote application install instruction 114, the daemon 116 may launch an installation module 118, such as a mobile installation proxy service that is executable on the host device 104. In some cases where the OS of the host device 104 is a version of iOS™, the installation module 118 may be com.apple.mobile_installation_proxy. The installation module 118 may examine one or more directories on the host device 104 to identify an archive, package, or other file that may be employed to install the application 106. In some cases where the OS of the host device 104 is a version of iOS™, the installation module 118 may identify a file with a .ipa extension indicating an archive file, and the installation module 118 may access the .ipa file to install the application 106. In some implementations, the installation module 118 or the daemon 116 may send information to the analysis server device(s) 102 indicating the progress (e.g., percentage complete) of the installation of the application 106. Code Example 1 provides an example of code that may be employed, in the initialization module 112 or in other modules, to install the application 106 on the host device 104.

Code Example 1

```
// connect to the remote device
AMDeviceConnect(iDevice);
// check if device is paired correctly
AMDeviceIsPaired(iDevice);
// start the session
AMDeviceStartSession(iDevice);
// start the AFC (Apple File Connection) service
AMDeviceStartService(device, CFSTR("com.apple.afc"), &afcFile, NULL);
```

```
// start the mobile install proxy
AMDeviceStartService(device, CFSTR("com.apple.m-
obile.installation_proxy"), &installFile, NULL);
// install the application to be debugged
AMDeviceInstallApplication(installFile, path, options,
installCallback, NULL);
// the installCallback checks the status
CFStringRef status=CFDictionaryGetValue(dict, CFSTR
("Status"));
CFNumberGetValue(CFDictionaryGetValue(dict, CFSTR
("PercentComplete")), kCFNumberSInt32Type, &Percent-
Complete);
```

Code Example 1 and the other code examples provided herein are not limiting of implementations. Although the code examples may be written in a particular programming language, style, grammar, or syntax, and may reference particular methods, method signatures, parameters, variables, classes, and libraries, implementations may employ any language, style, grammar, syntax, methods, method signatures, parameters, variables, classes, or libraries to implement the features and functionality described herein.

After or contemporaneously with the installation of the application 106, the initialization module 112 may send a remote debug module launch instruction 120 to the daemon 116, instructing the daemon 116 to launch a remote debug module 122. In some cases where the OS of the host device 104 is a version of iOS™, the remote debug module 122 may be a version of com.apple.debugserver. On launching the remote debug module 122, the daemon 116 may determine a port number 124 that may be employed for communicating with the remote debug module 122. The daemon 116 may provide the port number 124 to one or more of the remote control module 108, the debugging command module 110, or the initialization module 112.

The initialization module 112 may launch a debug module 126 (e.g., a local debug module) on the analysis server device(s) 102. Implementations support the use of any debugger as the debug module 126, including but not limited to the LLDB Debugger developed by the LLVM Developer Group, or the GNU Debugger (GDB) developed by the GNU Project. In some implementations, the debug module 126 may be included in an IDE that includes one or more software development tools, such as the XCode™ IDE developed by Apple™ Corp. of Cupertino, Calif., U.S.A. In some implementations, the debug module 126 may include an engine that is configured to receive, process, and execute instructions written in a programming language. For example, the debug module 126 may be configured to execute instructions written in the Python™ programming language developed by the Python Software Foundation, or in the CPython™ reference implementation of Python™ provided by the Python Software Foundation. The initialization module 112 may provide the port number 124 to the debug module 126, along with an address (e.g., the Internet Protocol (IP) address) of the host device 104, to enable the debug module 126 to establish a communication session or other network connection with the remote debug module 122. The debug module 126 and the remote debug module 122 may then communicate using the communication session. The communication session may be established according to a communication protocol such as the Transmission Control Protocol (TCP) or IP, and may be secured or unsecured. Code Example 2 provides an example of code that may be employed, in the initialization module 112 or in other modules, to launch the remote debug module 122 on the host device 104.

Code Example 2

```
// After the application is installed, the debugger is launched
launch_debugger(device, appPath); // where device is the
device identifier of the device and appPath is the path of the
app on the disk.
// The debugserver may be part of an image that is mounted on
the host device. First
// mount the image which includes debugserver. The mount-
DeveloperImage()function
// determines the iOS™ device and iOS™ version. After this,
the appropriate image may be
// selected to be mounted.
// Example:
// /Applications/Xcode.app/Contents/Developer/Platforms/
iPhoneOS.platform/DeviceSupport /6.1/DeveloperDiskIm-
age.dmg
// mount image
AMDeviceMountImage(device, imagePath, options,
&mountCallback, 0); // mounts the image.
// Once mounted, start the debugserver.
// startRemoteDebugServer() starts the remote device debug-
server by using AMDeviceStartService()
// start the remote device debugserver
AMDeviceStartService(device, CFSTR("com.apple.debug-
server"), &gdbFile, NULL)==0);
// Where gdbFile is the file handle and the local debug module
uses a host address and port
//number to connect. So an intermediate socket is created to
transfer data.
example_socket=CFSocketCreateWithNative();
struct sockaddr_in addr4;
memset(&addr4, 0, sizeof(addr4));
addr4.sin_len=sizeof(addr4);
addr4.sin_family=AF_INET;
addr4.sin_port=htons(8912);
addr4.sin_addr.s_addr=htonl(INADDR_ANY);
CFSocketRef fdvendor=CFSocketCreate()
// In this example, 8912 is the port on the local device. This is
where the local debug module
// issues the connect command. The local debug module
issues commands that follow:
// select the platform
platform select remote-ios—sysroot
/Applications/Xcode.app/Contents/Developer/Platforms/iP-
honeOS.platform/DeviceSupport
/*\n\
// create a target based on the app target create
\"{disk_app}\"\n\
// connect to 8912 port and invoke scripting mode
script LLDB_device_app=\"{deviceApp}\"\n\
script LLDB_connect_url="connect://127.0.0.1:8912\"\n\
script LLDB_handle_command=\"command script add -s
asynchronous -f
{python_command}.fsrun_command run\"\n\
command script import \"{python_file_path}\"\n\
```

The debug module 126 may instruct the remote debug module 122 to launch the application 106 on the host device 104. In some implementations, the remote debug module 122 may receive an application identifier (ID), such as a universally unique ID (UUID) that identifies the application 106. The remote debug module 122 may receive the application ID from the daemon 116, the daemon 116 having received the application ID from the installation module 118 following installation of the application 106. The remote debug module 122 may then query the installation module 118 to determine, based on the application ID, a directory path or location where the application 106 was installed. The remote debug module 122 may launch the application 106 from its installed location. After launching, the application 106 may pause execution at a first, default breakpoint.

The debug module 126 may then begin sending one or more debug commands 128 to the remote debug module 122, to remotely control the debugging of the application 106 on the host device 104. In some implementations, the debug module 126 may provide a shell interface that is configured to accept instructions written in a programming language such as Python™ or CPython™. Code Example 3 provides an example of code that may be employed, in the debugging command module 110 or in other modules, to issue commands for remote debugging.

Code Example 3

```
// Put the local debug module in Python™ scripting mode and
issue further commands:
#define LLDB_IOS_MODULE CFSTRC("\
import lldb\n\
\n\
def_13 lldb_init_module(debugger, internal_dict):\n\
# These two are passed in by the script which loads us\n\
device_app=internal_dict['LLDB_device_app']\n\
connect_url=internal_dict['LLDB_connect_url']\n\
handle_command=internal_dict['LLDB_handle_com-
mand']\n\
lldb.target.modules[0].SetPlatformFileSpec(lldb.SB-
FileSpec(device_app))\n\
lldb.debugger.HandleCommand(handle_command)\n\
error=lldb.SBError()\n\
lldb.target.ConnectRemote(lldb.target.GetDebugger().
GetListener(),connect_url,None,error)
\n\
\n\
def fsrun_command(debugger, command, result, internal_
dict):\n\
error=lldb.SBError()\n\          lldb.target.Launch(lldb.S-
BLaunchInfo(['{args}']),error)\n\ print str(error)\n\ ")
// Once in this mode, the application is launched and stopped
for the next command.
// Python™ may be used to pass commands through the
communication session.
#define   PREP_CMDS_PATH    "/tmp/LLDB-lldb-prep-
cmds-"
//
// Python™ interface to debugserver
//
#define LLDB_SHELL "python -u -c \"import time;
time.sleep(0.5); print 'breakpoint set -n
\"application:didFinishLaunchingWithOptions:\"';
time.sleep(5); print 'run'; time.sleep(120);
print 'bt all' ; time.sleep(5); print 'process continue';
time.sleep(10); print 'bt all';
time.sleep(5); print 'process continue'; time.sleep(2); print
'process interrupt'; time.sleep(5);
print 'po [[UIApp keyWindow] recursiveDescription]';
time.sleep(5); print 'register read --all';
time.sleep(5); print 'process continue'; time.sleep(5); print
'image list'; time.sleep(5); print 'process interrupt';
time.sleep(5); print 'po [[UIApp keyWindow] recursiveDe-
scription]';
time.sleep(5); print 'bt all'; print 'process continue';
time.sleep(2000000)\" | lldb -s " PREP_CMDS_PATH
// Once the Python™ interactive shell launches, Python™
may read the next debugger
```

// command from a file and pass it to the local debug module for application level
// debugging.

Figure 2:
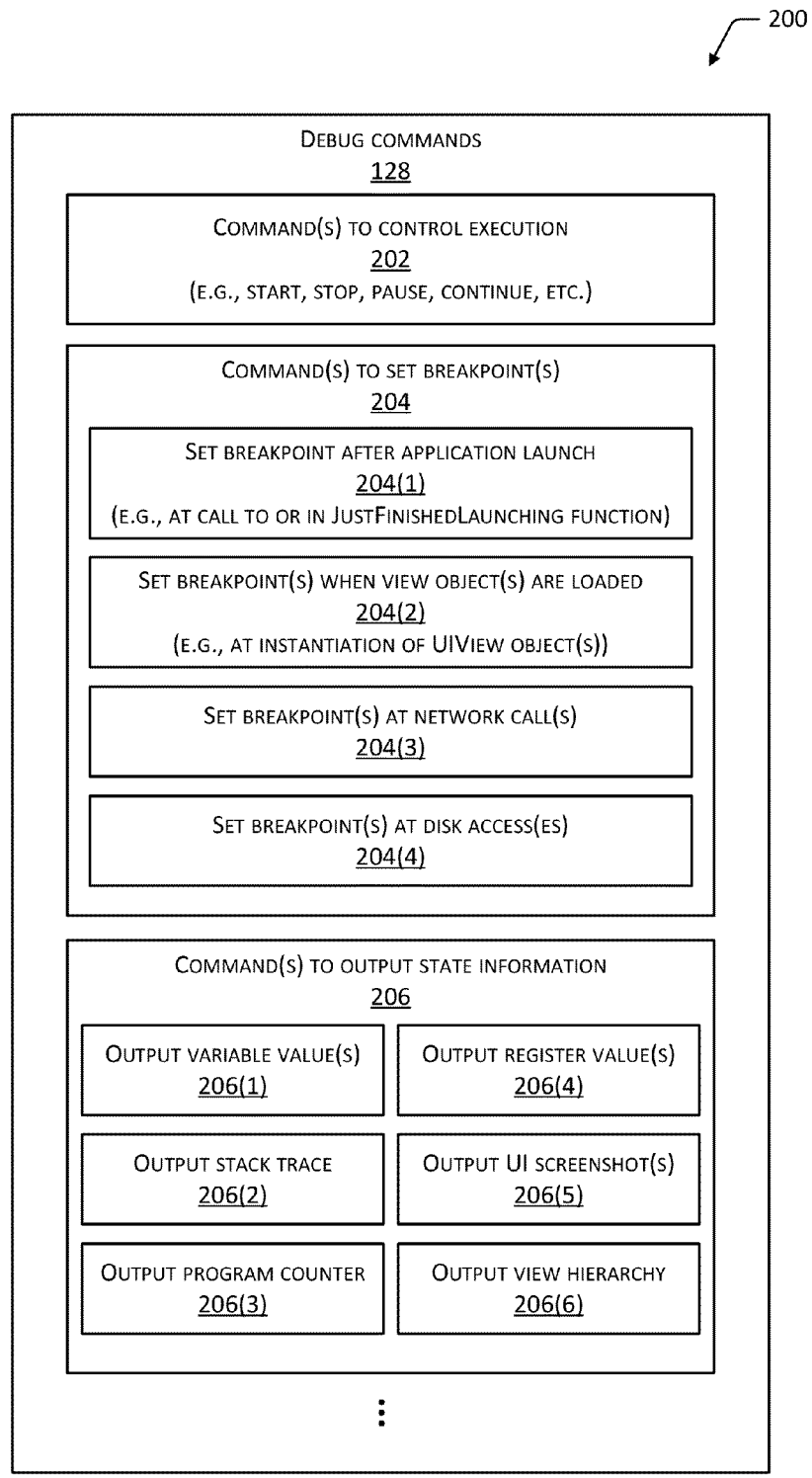
FIG. 2 depicts a schematic of example debug commands that may be employed in the remote debugging of an application.

FIG. 2 depicts a schematic 200 of example debug commands 128 that may be employed in the remote debugging of the application 106. The debug commands 128 may be described using any programming language. In some implementations, the debug commands 128 may be described using a version of the Python™ or CPython™ programming language. As shown in FIG. 2, the debug commands 128 may include one or more commands to control execution 202, such as commands to start, stop, pause, continue, or terminate the execution of the application 106 through the remote debug module 122.

The debug commands 128 may include one or more commands to set breakpoints 204. Breakpoints may be set at any location in the application 106, to pause the execution of the application 106 at any location in its code. The command(s) to set breakpoint(s) 204 may include a command to set a breakpoint after application launch 204(1). For example, a breakpoint may be set at a call to, or in, a JustFinishedLaunching function in the application 106. The command(s) to set breakpoint(s) 204 may include a command to set one or more breakpoints when a view object is loaded 204(2), such as at instantiation of UIView object(s) in the application 106. The command(s) to set breakpoint(s) 204 may include a command to set one or more breakpoints at network calls 204(3), to pause execution of the application 106 at one or more calls to send or receive data to external processes over a network. The command(s) to set breakpoint(s) 204 may include a command to set one or more breakpoints at disk access(es) 204(4), to pause execution of the application 106 at one or more calls to write data to storage or read data from storage on the host device 104.

Implementations support the setting of any number of breakpoints, at any location in the code of the application 106. In some cases, the breakpoint(s) may be specified by one or more users investigating the application 106, such as application developers, testers, owners, managers, and so forth. In some cases, the breakpoint(s) may be set at locations where failure of the application 106 may be anticipated or likely based on past behavior of the application 106 or of similar applications. Breakpoint(s) may also be set to investigate potential security issues involving the application 106, such as whether the application 106 is performing unexpected or unauthorized disk access or network communication operations.

The debug commands 128 may also include any number of commands to output state information 206. Such state information may include information describing the state of the application 106 while it is paused at a breakpoint, or information describing the state of the host device 104 while the application 106 is paused or while the application 106 is executing. The command(s) to output state information 206 may include command(s) to output variable value(s) 206(1), such as the value(s) of one or more variables of the application 106. The command(s) to output state information 206 may include command(s) to output stack trace 206(2), such as the stack trace of the application 106 after a crash or failure (e.g., a stack dump). The command(s) to output state information 206 may include command(s) to output program counter 206(3), such as a value of the program counter associated with the application 106. The command(s) to output state information 206 may include command(s) to output register value(s) 206(4), such as values of one or more floating pointer registers, general purpose registers, or other registers of the processor of the host device 104. The command(s) to output state information 206 may include command(s) to output UI screenshot(s) 206(5), such as image(s) that capture the state or appearance of a UI of the application 106 while the application 106. The command(s) to output state information 206 may include command(s) to output view hierarchy 206(6), such as a hierarchical description of the objects (e.g., UIView and child objects) instantiated by the application 106. The debug commands 128 may also include other types of commands to control remote debugging of the application 106.

Figure 3:
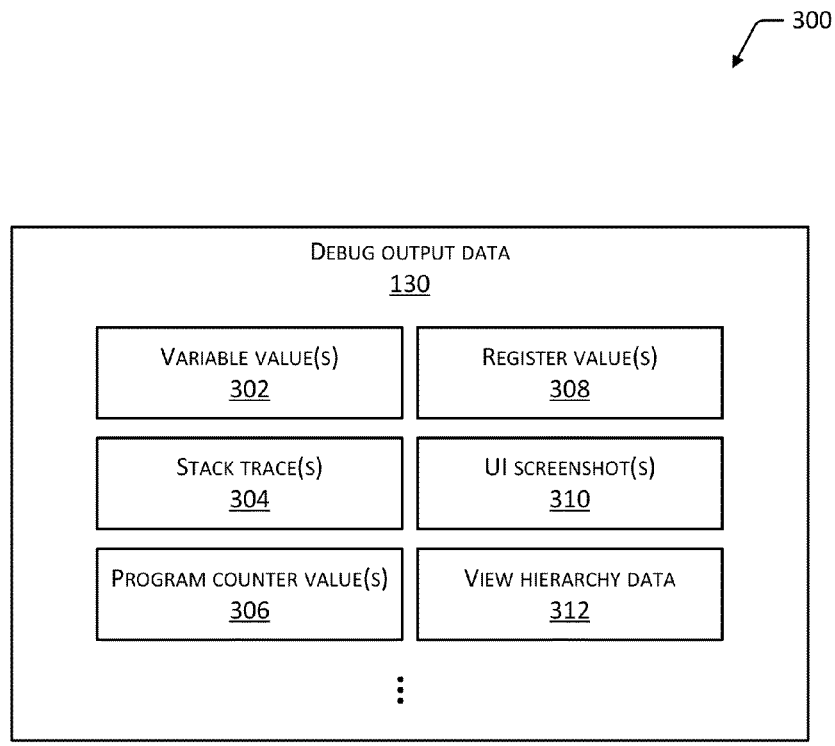
FIG. 3 depicts a schematic of example debug output data that may be generated through remote debugging of an application.

Returning to FIG. 1, the remote debug module 122 may collect debug output data 130 during the debugging of the application 106. The debug output data 130 may be written to storage (e.g., to a file) by the remote debug module 122. FIG. 3 depicts a schematic 300 of example debug output data 130 that may be generated through remote debugging of the application 106. The debug output data 130 may be generated, stored, and communicated in any format.

As shown in FIG. 3, the debug output data 130 may include one or more variable values 302, which may be generated through the execution of the command(s) to output variable value(s) 206(1). The debug output data 130 may include one or more stack traces 304, which may be generated through the execution of the command(s) to output stack trace 206(2). The debug output data 130 may include one or more program counter values 306, which may be generated through the execution of the command(s) to output program counter 206(3). The debug output data 130 may include one or more register values 308, which may be generated through the execution of the command(s) to output register value(s) 206(4). The debug output data 130 may include one or more UI screenshots 310, which may be generated through the execution of the command(s) to output UI screenshot(s) 206(5). The debug output data 130 may include view hierarchy data 312, which may be generated through the execution of the command(s) to output view hierarchy 206(6). The debug output data 130 may also include other types of data collected during the debugging of the application 106.

Returning to FIG. 1, in some implementations the remote debug module 122 may access a shared memory 132 on the host device(s) 104. The shared memory 132 may include a portion of the memory of the host device(s) 104. The host device(s) 104 may be configured such that the shared memory 132 is available to be accessed as a public or private shared directory on one or more other devices. For example, the analysis server device(s) 102 may be configured to designate a mounted shared memory 134 that is a mount point into the shared memory 132, enabling processes or users of the analysis server device(s) 102 to access the shared memory 132 and the information stored therein. In some implementations, the debug output data 130 may be stored in a file in the shared memory 132 and thus be accessible by processes and users on the analysis server device(s) 102. Alternatively, the debug output data 130 may be communicated over another network connection to the analysis server device(s) 102.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), WWANs, WLANs, mobile communications networks (e.g. 3G, 4G, etc.), and so forth. In some implementations, communications between the various devices in the environment 100 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol. In some implementations, the analysis server device(s) 102 may communicate with the host device(s) 104 using a dedicated, wired connection such as a Universal Serial Bus (USB) connection.

Figure 4:
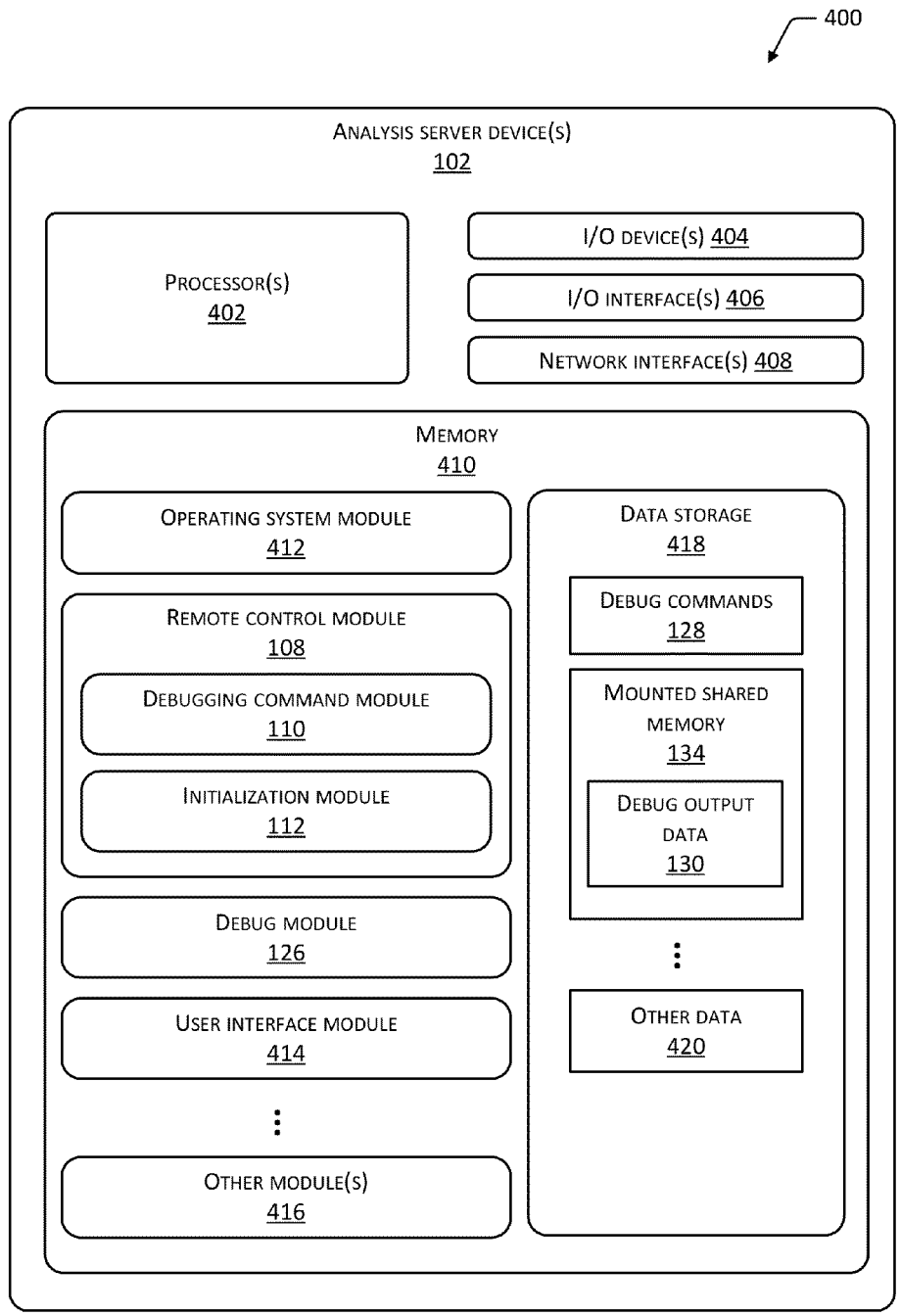
FIG. 4 depicts a block diagram of an example analysis server device configured to remotely control operations on a host device.

FIG. 4 depicts a block diagram 400 of an example of the analysis server device(s) 102 configured to remotely control debugging operations on the host device(s) 104, and receive the debug output data 130 collected on the host device(s) 104. As shown in the block diagram 400, the analysis server device 102 may include one or more processors 402 (e.g., hardware-implemented processor(s)) configured to execute one or more stored instructions. The processor(s) 402 may comprise one or more cores.

The analysis server device 102 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the analysis server device 102, or may be externally placed.

The analysis server device 102 may include one or more I/O interfaces 406 to enable components or modules of the analysis server device 102 to control, interface with, or otherwise communicate with the I/O device(s) 404. The I/O interface(s) 406 may enable information to be transferred in or out of the analysis server device 102, or between components of the analysis server device 102, through serial communication, parallel communication, or other types of communication. For example, the I/O interface(s) 406 may comply with a version of the RS-232 standard for serial ports, or with a version of the Institute of Electrical and Electronics Engineers (IEEE) 1284 standard for parallel ports. As another example, the I/O interface(s) 406 may be configured to provide a connection over USB or Ethernet. In some cases, the I/O interface(s) 406 may be configured to provide a serial connection that is compliant with a version of the IEEE 1394 standard. The analysis server device 102 may also include one or more busses or other internal communications hardware or software that allow for the transfer of data between the various modules and components of the analysis server device 102.

The analysis server device 102 may include one or more network interfaces 408 that enable communications between the analysis server device 102 and other network accessible computing devices, such as the host device(s) 104. The network interface(s) 408 may include one or more network interface controllers (NICs) or other types of transceiver devices configured to send and receive communications over a network.

The analysis server device 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the analysis server device 102. In some implementations, the memory 410 may provide storage of computer-readable instructions or other information in a non-transitory format.

The memory 410 may include an OS module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux™ operating system; any version of the UNIX™ operating system; any version of iOS™ from Apple™ Corp. of Cupertino, Calif., U.S.A.; any version of Windows™ or Windows Mobile™ from Microsoft™ Corp. of Redmond, Wash., U.S.A.; any version of Android™ from Google™ Corp. of Mountain View, Calif., U.S.A. and its derivatives from various sources; any version of Palm OS™ from Palm Computing™, Inc. of Sunnyvale, Calif., U.S.A. and its derivatives from various sources; any version of BlackBerry OS™ from Research In Motion™ Ltd. of Waterloo, Ontario, Canada; any version of VxWorks™ from Wind River Systems™ of Alameda, Calif., U.S.A.; or other operating systems.

The memory 410 may include one or more of the modules described above as executing on the analysis server device 102, such as the remote control module 108, the debugging command module 110, the initialization module 112, and the debug module 126. In some implementations, the memory 410 may include a UI module 414. The UI module 414 may enable a user of the analysis server device 102 to specify the debug commands 128 to be employed in remotely debugging the application 106, and to view or otherwise consume the debug output data 130 generated through debugging the application 106. The memory 410 may also include one or more other modules 416, such as a user authentication module or an access control module to secure access to the analysis server device 102, and so forth.

The memory 410 may include data storage 418 to store data for operations of the analysis server device 102. The data storage 418 may comprise a database, array, structured list, tree, or other data structure, and may be a relational or a non-relational datastore. The data storage 418 may store data such as that described above, including but not limited to the debug commands 128 and the debug output data 130. In some cases, the data storage 418 may include the mounted shared memory 134 that is a mount point into the shared memory 132, e.g., a shared portion of the memory of the host device 104. The mounted shared memory 134 may store the debug output data 130. The data storage 418 may also store other data 420, such as user authentication information or access control data. In some implementations, at least a portion of the information stored in the data storage 418 may be stored externally to the analysis server device 102, on other devices that may communicate with the analysis server device 102 via the I/O interface(s) 406 or via the network interface(s) 408.

Figure 5:
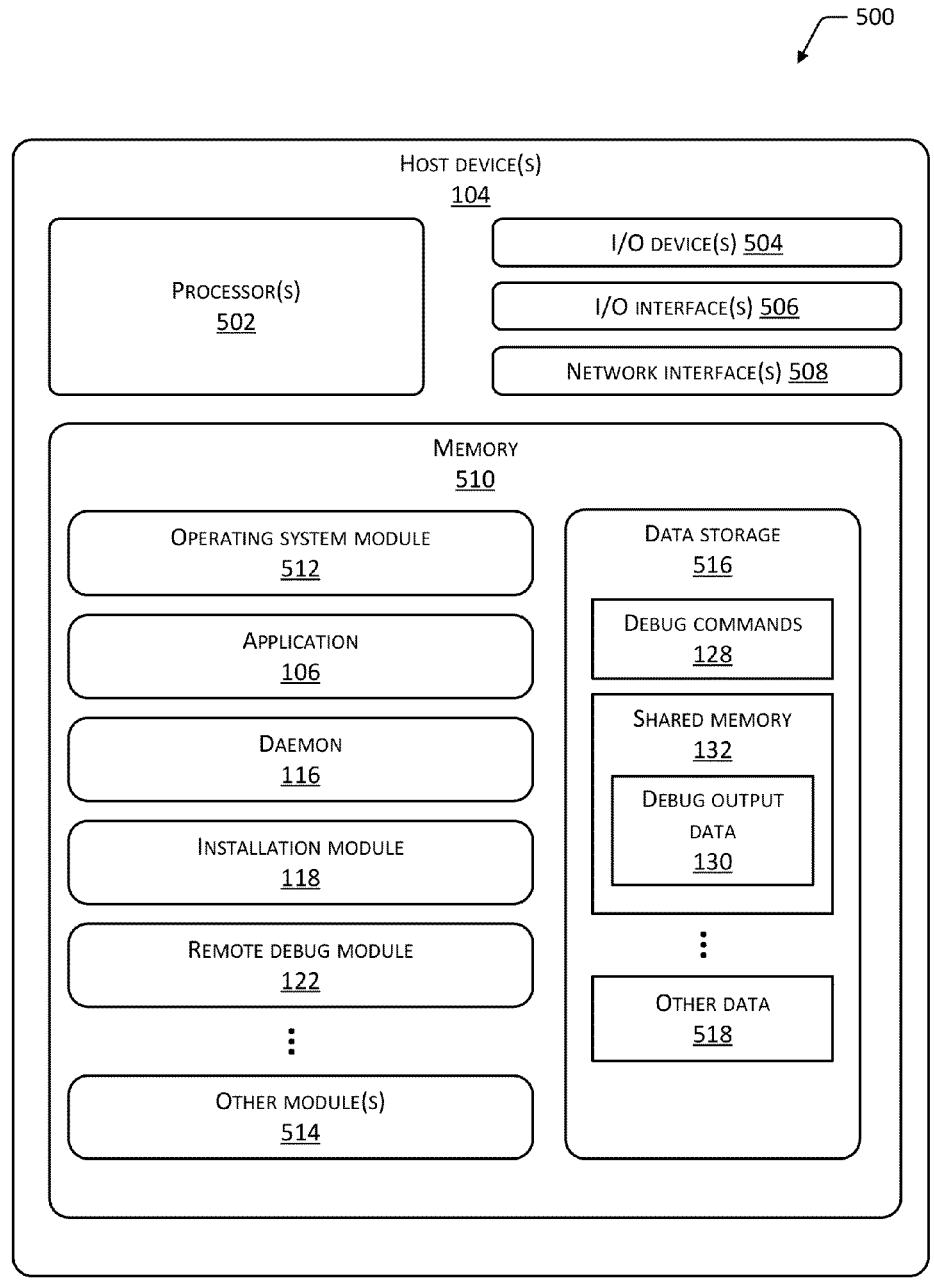
FIG. 5 depicts a block diagram of an example host device configured to enable the remote debugging of an application executing on the host device.

FIG. 5 depicts a block diagram 500 of an example of the host device(s) 104. As shown in the block diagram 500, the host device 104 may include one or more processors 502 (e.g., hardware-implemented processor(s)) configured to execute one or more stored instructions. The processor(s) 502 may comprise one or more cores. The host device 104 may include one or more I/O devices 504, one or more I/O interfaces 506, and one or more network interfaces 508 as described above respectively with reference to I/O device(s) 404, I/O interface(s) 406, and network interface(s) 408.

The host device 104 may include one or more memories, described herein as memory 510. The memory 510 comprises one or more CRSM, as described above with reference to the memory 410. The memory 510 may include an OS module 512 that is configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412. The memory 510 may include one or more of the modules described above as executing on the host device 104, such as the application 106, the daemon 116, the installation module 118, and the remote debug module 122. The memory 510 may also include one or more other modules 514, such as a user authentication module or an access control module to secure access to the host device 104, and so forth.

The memory 510 may include data storage 516 to store data for operations of the host device 104. The data storage 516 may comprise a database, array, structured list, tree, or other data structure, and may be a relational or a non-relational datastore. The data storage 516 may store data such as that described above, including the debug commands 128 and the debug output data 130. A portion of the data storage 516 may also be shared and made available to other devices as the shared memory 132. In some implementations, a mount point into the shared memory 132 may be created to enable processes or users of the analysis server device(s) 102 to access the shared memory 132 on the host device 104. Using such a mount point, the debug output data 130 may be provided to the analysis server device(s) 102. The data storage 516 may also store other data 518, such as user authentication information or access control data. In some implementations, at least a portion of the information stored in the data storage 516 may be stored externally to the host device 104, on other devices that may communicate with the host device 104 via the I/O interface(s) 506 or via the network interface(s) 508.

Figure 6:
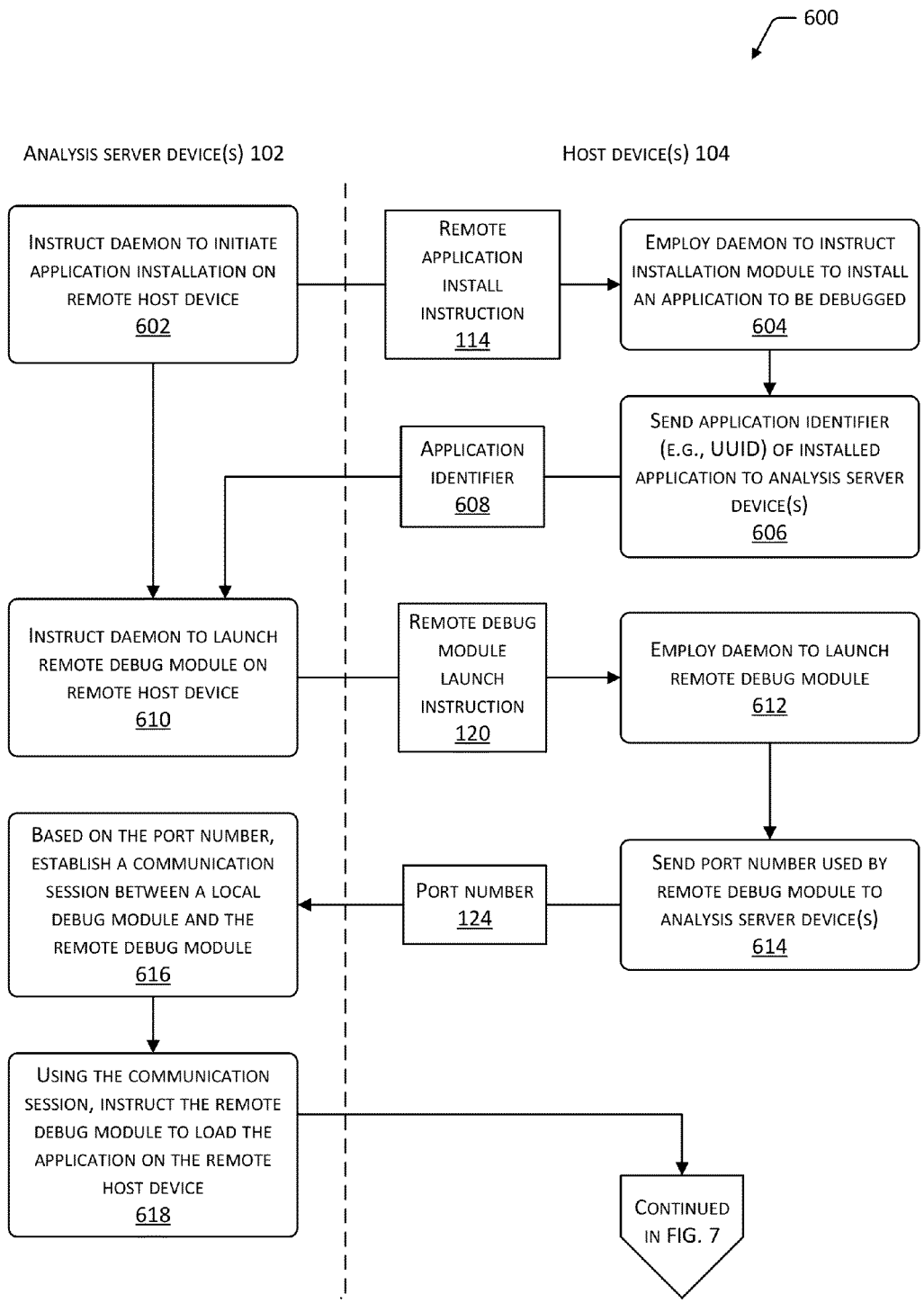
FIG. 6 depicts a flow diagram of a process for installing an application to be debugged on a host device, and for establishing a communication session for remote debugging.

FIG. 6 depicts a flow diagram 600 of a process for installing the application 106 to be debugged on the host device 104, and for establishing a communication session to be employed for remote debugging. Operations of the process may be performed by the remote control module 108, the debugging command module 110, the initialization module 112, the debug module 126, other modules executing on the analysis server device(s) 102, the daemon 116, the installation module 118, the remote debug module 122, other modules executing on the host device(s) 104, or other modules executing on other devices.

At 602, the initialization module 112 or another module may send the remote application install instruction 114, to instruct the daemon 116 to initiate the installation of the application 106 on the host device 104.

At 604, on receiving the remote application install instruction 114, the daemon 116 may instruct the installation module 118 to install the application 106 to be debugged. As described above, the installation module 118 may employ a .ipa file or some other archive, package, or installation file to install the application 106.

At 606, an application ID 608 associated with the application 106 may be determined by the installation module 118 and sent to the analysis server device(s) 102, indicating that the application 106 has been installed. In some cases, the application ID 608 may be a UUID that uniquely identifies a particular installed instance of the application 106 on the particular host device 104.

At 610, the initialization module 112 or another module may send the remote debug module launch instruction 120, to instruct the daemon 116 to launch the remote debug module 122 on the host device 104.

At 612, the daemon 116 may launch the remote debug module 122 as described above.

At 614, the port number 124 used by the remote debug module 122 may be sent to the analysis server device(s) 102, enabling a communication session to be established between the debug module 126 and the remote debug module 122.

At 616, based on the port number 124, a communication session may be established between the debug module 126 and the remote debug module 122, enabling remote debugging of the application 106.

At 618, using the communication session established at 616, the debug module 126 may instruct the remote debug module 122 to load the application 106 in memory on the host device 104, such that the remote debug module 122 is attached to the application 106 and in a state to receive the debug commands 128. The process may continue as described with reference to FIG. 7.

Figure 7:
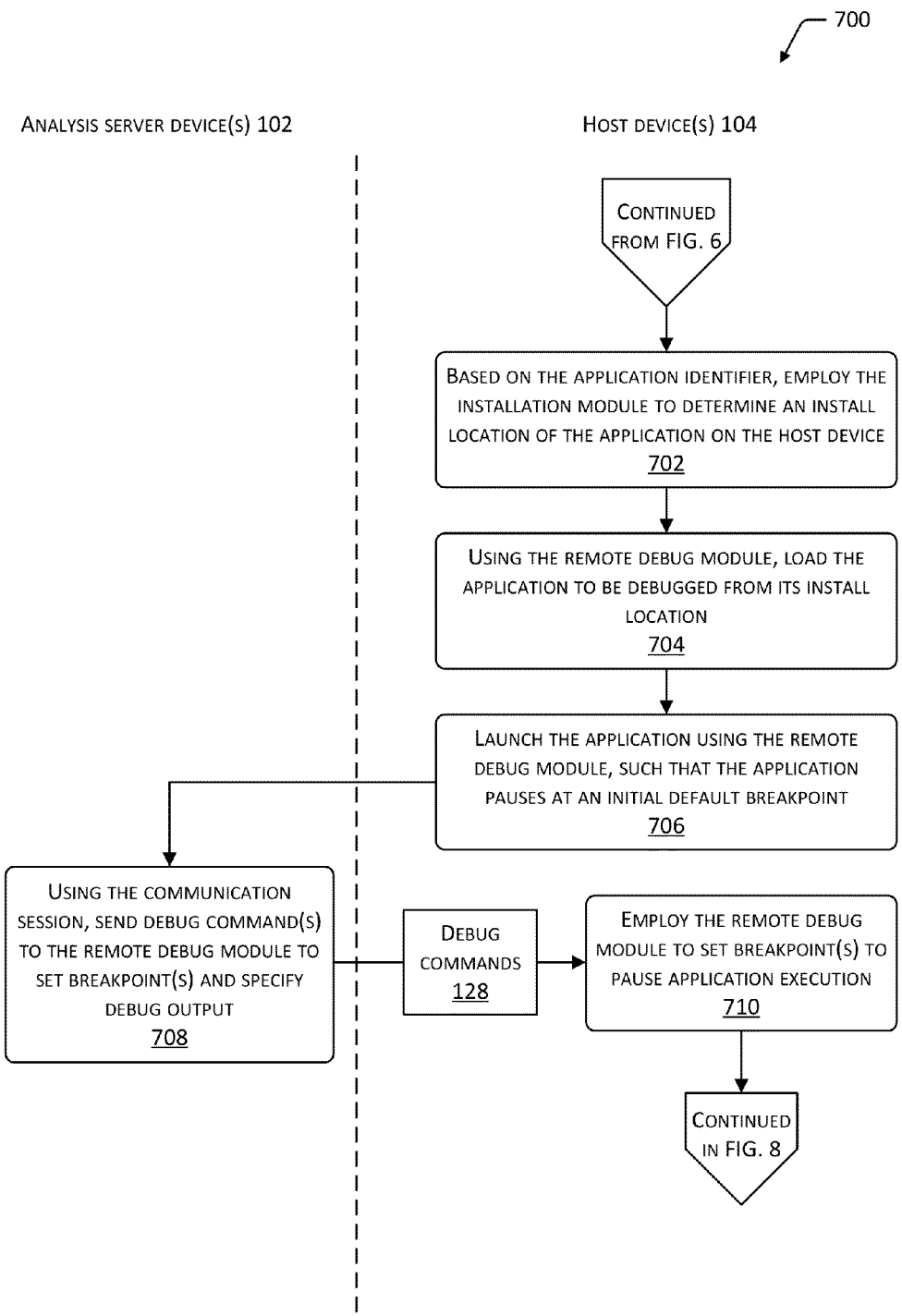
FIG. 7 depicts a flow diagram of a process for launching an application to be debugged on a host device, and setting one or more breakpoints to pause execution of the application during debugging.

FIG. 7 depicts a flow diagram 700 of a process for launching the application 106 to be debugged on the host device 104, and setting one or more breakpoints to pause execution of the application 106 during debugging. Operations of the process may be performed by the remote control module 108, the debugging command module 110, the initialization module 112, the debug module 126, other modules executing on the analysis server device(s) 102, the daemon 116, the installation module 118, the remote debug module 122, other modules executing on the host device(s) 104, or other modules executing on other devices.

At 702, the remote debug module 122 may employ the application ID 608 to determine the location of the installed application 106 on the host device 104. As described above, the remote debug module 122 may query the installation module 118 to determine the location of the installed application 106.

At 704, the remote debug module 122 may load the application 106 into memory on the host device 104, from the installed location of the application 106.

At 706, the remote debug module 122 may launch the application 106 such that it pauses at an initial default breakpoint.

At 708, the debugging command module 110 or another module may begin sending debug commands 128 to the remote debug module 122, such as command(s) to control execution 202, command(s) to set breakpoint(s) 204, and command(s) to output state information 206.

At 710, the remote debug module 122 may receive the debug commands 128 and set one or more breakpoints in the application 106 based on the command(s) to set breakpoint(s) 204. The process may continue as described with reference to FIG. 8.

Figure 8:
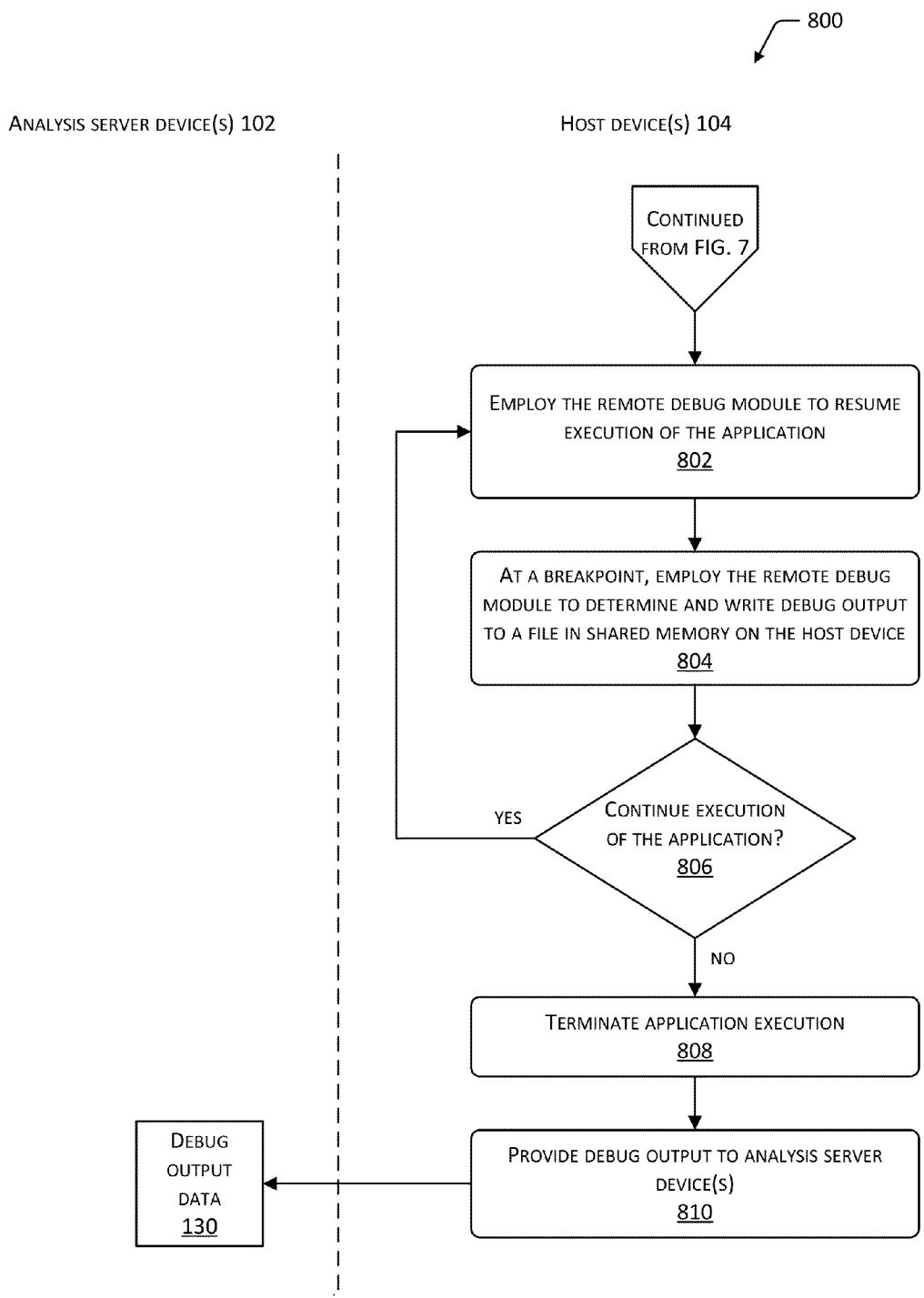
FIG. 8 depicts a flow diagram of a process for debugging an application executing on a host device, and capturing debug output data generated during a debugging session.

FIG. 8 depicts a flow diagram 800 of a process for debugging the application 106 executing on the host device 104, and capturing the debug output data 130 generated during a debugging session. Operations of the process may be performed by the remote control module 108, the debugging command module 110, the initialization module 112, the debug module 126, other modules executing on the analysis server device(s) 102, the daemon 116, the installation module 118, the remote debug module 122, other modules executing on the host device(s) 104, or other modules executing on other devices.

At 802, the remote debug module 122 may be employed to resume execution of the application 106 following a breakpoint (e.g., such as the initial breakpoint reached at 706).

At 804, the application 106 may reach a subsequent breakpoint. At the breakpoint, the remote debug module 122 may be employed to collect the debug output data 130 specified in the command(s) to output state information 206. The debug output data 130 may be written to a file on the host device 104.

At 806, a determination is made whether to continue execution of the application 106, based on whether the application 106 has terminated through a crash or failure, exited through normal operation, or otherwise stopped executing. If the application 106 is to continue executing beyond the currently reached breakpoint, the process may return to 802 and the execution of the application 106 may resume. If the application is to discontinue executing, the process may proceed to 808 where execution of the application 106 is terminated.

At 810, the debug output data 130 may be provided to the analysis server device(s) 102. As described above, in some cases the debug output data 130 may be provided to the analysis server device(s) 102 through use of a mount point into the shared memory 132. Alternatively, the debug output data 130 may be sent to the analysis server device(s) 102 using the communication session established between the debug module 126 and the remote debug module 122.

Output Example 1 provides an example of debug output data 130 that may be generated during the remote debugging of the application 106. The particular debug output data 130 included in the Output Example 1, and the format in which it is output, is not limiting of implementations.

Output Example 1 iOS_LLDB -m -d -b Payload/Example.app/
Installation Phase
[...] Waiting for (null) to be connected
Debugging Phase
[0%] Looking up developer disk image
[90%] Mounting developer disk image
[95%] Developer disk image already mounted
[100%] Connecting to remote debug server on the device
Process 0 connected
(lldb) breakpoint set -n application:didFinishlaunchingWithOptions:
Breakpoint 1:2 locations.
(lldb) run
success
2 locations added to breakpoint 1
(lldb) 2014-01-06 00:52:20.762 Example [8212:60b] SSL Kill Switch-Hook Enabled.
Process 8212 stopped
* thread #1: tid 0x82bb1, 0x0018d2d0 Example'-[MQAppDelegate application:didFinishLaunchingWithOptions], queue='com.apple.main-thread, stop reason =breakpoint 1.3
    frame #0: 0x0018d2d0 Example'-[MQAppDelegate application:didFinishLaunchingWithOptions:]
Example'-[MQAppDelegate application:didFinishLaunchingWithOptions:]:
  ->0x18d2d0: push {r4, r5, r6, r7, lr}
  0x18d2d2: add r7, sp, #12
  0x18d2d4: push.w {r8, r10}
  0x18d2d8: sub sp, #192
(lldb) bt all
* thread #1: tid=0x82bb1, 0x0018d2d0 Example'-[MQAppDelegate application:didFinishLaunchingWithOptions:], queue='com.apple.main-thread, stop reason =breakpoint 1.3
    frame #0: 0x0018d2d0 Example'-[MQAppDelegate application:didFinishLaunchingWithOptions:]
    frame #1: 0x3017daac UIKit'<redacted>+276
    frame #2: 0x3017d4f2 UIKiT'<redacted>+1390
    frame #3: 0x30177b40 UIKit'<redacted>+720
    frame #4: 0x30112a06 UIKit'<redacted>+3142
    frame #5: 0x30111cfc UIKit'<redacted>+72 frame #6: 0x30177320UIKit'<redacted>+664
frame #7: 0x325cb76c GraphicsServices'<redacted>+608
frame #8: 0x325cb356 GraphicsServices'<redacted>+34
frame #9: 0x2d953776 CoreFoundation'<redacted>+34
frame #10: 0x2d953712 CoreFoundation'<redacted>+346
frame #11: 0x2d951ede CoreFoundation'<redacted>+1406
frame #12: 0x2d8bc470 CoreFoundation'CFRunLoopRunSpecific+524
frame #13: 0x2d8bc252 CoreFoundation'CFRunLoopRuninMode+106
frame #14: 0x301765c2 UIKit'<redacted>+762
frame #15: 0x30171844 UIKit'UIApplicationMain+1136
frame #16: 0x000b633c Example'main+76
frame #17: 0x38628ab6 libdyld.dylib'<redacted>+2
thread #2: tid=0x82c50, 0x386cc838 libsystem_kernel.dylib'kevent64+24, queue='com.apple.libdispatch-manager
   frame #0: 0x386cc838 libsystem_kernel.dylib'kevent64+24
   frame #1: 0x3861b0d4 libdispatch.dylib'<redacted>+232
   frame #2: 0x38615622 libdispatch.dylib'<redacted>+38
thread #3: tid=0x82c51, 0x386dfc7c libsystem_kernel.dylib'_workq_kernreturn+8
   frame #0: 0x386dfc7c libsystem_kernel.dylib'_workq_kernreturn+8
   frame #1: 0x38743e0a libsystem_pthread.dylib'_pthread_wqthread+310
   frame #2: 0x38743cc4 libsystem_pthread.dylib'start_wqthread +8
thread #4: tid=0x82c5d, 0x386dfc7c libsystem_kernel.dylib'_workq_kernreturn+8
   frame #0: 0x386dfc7c libsystem_kernel.dylib'_workq_kernreturn+8
   frame #1: 0x38743e0a libsystem_pthread.dylib'_pthread_wqthread+310
(lldb) process continue
Process 8212 resuming
Process 8212 stopped
* thread #1: tid=0x82bb1, 0x004f788c Example'-[SQAppDelegate application:didFinishLaunchingWithOptions:], queue='com.apple.main-thread,stop reason =breakpoint 1.4
   frame #0: 0x004f788c Example'-[SQAppDelegate application:didFinishLaunchingWithOptions:]
Example'-[SQAppDelegate application:didFinishbunchingWithOptions:]:
   ->0x4f788c: push {r4, r5, r6, r7, lr}
   0x4f788e: add r7, sp, #12
   0x4f7890: sub sp, #120
   0x4f7892: add.w r9, sp, #104
(lldb) bt all * thread #1: tid=0x82bb1, 0x004f788c Example'-[SQAppDelegate application:didFinishLaunchingWithOptions:], queue='com.apple.main-thread, stop reason =breakpoint 1.4
   frame 190 0: 0x004f788c Example'-[SQAppDelegate application:didFinishLaunchingWithOptions:]
   frame #1: 0x0018d3c8 Example'-[MQAppDelegate application:didFinishLaunchingWithOptions:]+248
   frame #2: 0x3017daac UIKit'<redacted>+276
   frame #3: 0x3017d4f2 UIKit'<redacted>+1390
   frame #4: 0x30177b40 UIKit'<redacted>+720
   frame #5: 0x30112a06 UIKit'<redacted>+3142
   frame #6: 0x30111cfc UIKit'<redacted>+72
   frame #7: 0x30177320 UIKit'<redacted>+664
   frame #8: 0x325cb76c GraphicsServices'<redacted>+608
   frame #9: 0x325cb356 GraphicsServices'<redacted>+34
   frame #10: 0x2d953776 CoreFoundation'<redacted>+34
   frame #11: 0x2d953712 CoreFoundation'<redacted>+346
   frame #12: 0x2d951ede CoreFoundation'<redacted>+1406
   frame #13: 0x2d8bc470 CoreFoundation'CFRunLoopRunSpecific+524
   frame #14: 0x2d8bc252 CoreFoundation'CFRunLoopRunInMode+106
   frame #15: 0x301765c2 UIKit'<redacted>+762
   frame #16: 0x30171844 UIKit'UIApplicationMain+1136
   frame #17: 0x000b633c Example'main+76
thread #2: tid=0x82c50, 0x386cc838 libsystem_kernel.dylib'kevent64+24, queue='com.apple.libdispatch-manager
   frame #0: 0x386cc838 libsystem_kernel.dylib'kevent64+24
   frame #1: 0x3861b0d4 libdispatch.dylib'<redacted>+232
   frame #2: 0x38615622 libdispatch.dylib'<redacted>+38
thread #5: tid=0x82cb0, 0x386dfc7c libsystem_kernel.dylib'_workq_kernreturn+8
   frame #0: 0x386dfc7c libsystem_kernel.dylib'_workq_kernreturn+8
   frame #1: 0x38743e0a libsystem_pthread.dylib'_pthread_wqthread+310
(lldb) process continue
Process 8212 resuming
Process 8212 stopped and restarted: thread 1 received signal: SIGCHLD
(lldb) 2014-01-06 00:53:25.366 Example[8212:60b] INFO: Reveal server started.
process interrupt
Process 8212 stopped
* thread #1: tid=0x82bb1, 0x386df2e8 libsystem_kernel.dylib'read$NOCANCEL+8, queue ='com.apple.main-thread, stop reason=signal SIGSTOP
   frame #0: 0x386df2e8 libsystem_kernel.dylib'read$NOCANCEL+8
libsystem_kernel.dylib'read$NOCANCEL+8:
   ->0x386df2e8: blo 0x386df300; read$NOCANCEL+32
   0x386df2ec: ldr r12, [pc, #4]; read$NOCANCEL+24
   0x386df2f0: ldr r12, [pc, r12]
   0x386df2f4: b 0x386df2fc ; read$NOCANCEL+28
(lldb) po [[UIApp keyWindow] recursiveDescription]
<UIWindow: 0x15612c80; frame=(0 0; 768 1024); gestureRecognizers=<NSArray: 0x15612860>; layer=<UIWindowvLayer: 0x15612a20>>
 | <UIView: 0x15611500; frame=(0 0; 768 1024); autoresize=W+H; layer=<CALayer: 0x156115a0>>
 | |<UILayoutContainerView: 0x1560a080; frame=(0 0; 768 1024); autoresize W+H; gestureRecognizers=<NSArray: 0x15744a70>; layer=<CALayer: 0x1560f800>>
 | | |<UINavigationTransitionView: 0x15600aa0; frame=(0 0; 768 1024);
clipsToBounds=YES; autoresize=W+H; layer=<CALayer: 0x156009f0>>
 | | | |<UIViewControllerWrapperView: 0x15589340; frame=(0 0; 768 1024);
autoresize=W+H; layer=<CALayer: 0x15589400>>
 | | | | |<UIView: 0x15753270; frame=(0 0; 768 1024); autoresize=W+H; layer=<CALayer: 0x157532d0>>
 | | | | | |<UIView: 0x15750cc0; frame=(0 0; 768 1024); autoresize=W+H;

```
animations={opacity=<CABasicAnimation:
0x1551fb40>;}; layer=<CALayer: 0x15750f00>>
        |||||||<UIImageView: 0x1574a210; frame=(-20 -20;
            808      1064);      autoresize     =W+H;
            userInteractionEnabled=NO;
            animations={<UIInterpolatingMotionEffect:
0x15524ca0>=<CABasicAnimation: 0x1551e300>; <UIIn-
terpolatingMotionEffect:
0x15525a30>=<CABasicAnimation:    0x1551e4a0>;};
layer=<CALayer: 0x1574a2a0>>-(null)
        |||||||<UIImageView: 0x15750430; frame=(0 0; 768
            1024); alpha=0;
autoresize    =W+H;    userInteractionEnabled=NO;
layer=<CALayer: 0x157505b0>>-(null)
        |||||||<UIImageView: 0x15751550; frame=(0 0; 768
            1024); autoresize=W+H; userinteractionEnabled=NO;
            layer=<CALayer: 0x15751fa0>>-(null)
        |||||||<UIView: 0x1574d0f0; frame=(0 60; 768 279);
            autoresize=W+BM;
layer=<CALayer: 0x1574d170>>
        ||||||||<FQButton: 0x15748b40; baseClass=UIButton;
            frame=(120    203;    530    72);   opaque=NO;
            autoresize=RM+BM;              layer=<CALayer:
            0x15748c60>>
        |||||||||<UIImageView: 0x15527d50; frame=(0 0; 530
            72);
clipsToBounds=YES;                        opaque=NO;
userInteractionEnabled=NO; layer=<CALayer:
0x1552a070>>-(null)
        |||||||||<UIButtonLabel: 0x15748dc0; frame=(231 23;
            68    26);   text='Sign    In';   clipsToBounds=YES;
            opaque=NO;              userInteractionEnabled=NO;
            layer=<CALayer:
0x15748e70>>
        ||||||||<FQButton: 0x15745da0; baseClass=UIButton;
            frame=(120    113;    530    72);   opaque=NO;
            autoresize=RM+BM; layer=<CALayer: 0x15745f40>>
        |||||||||<UIImageView: 0x1552f140; frame=(0 0; 530
            72);
clipsToBounds=YES;                        opaque=NO;
userInteractionEnabled=NO; layer=<CALayer:
0x1552f8a0>>-(null)
        |||||||||<UIButtonLabel: 0x15746be0; frame=(161 23;
            208     26);    text='New      Example     Account';
            clipsToBounds=YES;                    opaque=NO;
            userInteractionEnabled=NO;
layer=<CALayer: 0x15746d10>>
        |||||||<UILabel: 0x1574c850; frame=(20 51; 728 30);
            text='Accept credit cards. Run . . . '; opaque=NO;
            autoresize LM+RM+BM; userInteractionEnabled=NO;
layer=<CALayer: 0x1574c240>>
        ||||||<UIImageView: 0x1574de030; frame=(20 0; 728
            53);              autoresize=LM+RM+BM;
            userInteractionEnabled=NO;       layer=<CALayer:
            0x1574dec0>>-(null)
        |||||<UIImageView: 0x1574fdd0; frame=(76.8 102.4;
            614.4 819.2);
transform=[0.80000001, 0, 0, 0.80000001, 0, 0]; alpha=0;
autoresize=W+H;
userInteractionEnabled=NO;
animations={opacity=<CABasicAnimation: 0x1551fcd0>;
transform=<CABasic:Animation:    0x1551fc40>;   };
layer=<CALayer: 0x1574fd40>>-(null)
(lldb) register read --all
```

General Purpose Registers:
 r1=0x00689400
Example'example::protobuf::ServiceOptions::MergeFrom
(example::protobuf::ServiceOptions const&)+224
 r1=0x00000000
 r2=0x00689400
Example'example::protobuf::ServiceOptions::MergeFrom
(example::protobuf::ServiceOptions const&)+224
 r3=0x38682aa1 libsystem_c.dylib'_sread+1
 r4=0x15511c6c
 r5=0x00689400
Example'example::protobuf::ServiceOptions::MergeFrom
(example::protobuf::ServiceOptions const&)+224
 r6=0x00001000
 r7=0x27d4f264
 r8=0x15c42600
 r9=0x00000001
 r10=0x15511c6c
 r11=0x00689400
Example'example::protobuf::ServiceOptions::MergeFrom
(example::protobuf::ServiceOptions const&)+224
 r12=0x0000018c
 sp=0x27d4f25c
 lr=0x3864ec2d libsystem_c.dylib'_sread+13
 pc=0x386df2e8
    libsystem_kernel.dylib'read$NOCANCEL+8
 cpsr=0x00000010
Floating Point Registers:
 s0=0
 s1=0
 s2=0
 s3=0
 s4=0
 s5=0
 s6=0
 s7=0
 s8=164181
 s9=6.73e-28
 s10=3.03148e-13
 s11=4.31511e-26
 s12=6.59922e+10
 s13=1.54397e+13
 s14=3.59523e+12
 s15=1.02943e+16
 s16=0
 s17=0
 s18=3102
 s19=3102
 s20=0
 s21=0
 s22=0
 s23=0
 s24=0
 s25=0
 s26=0
 s27=0
 s28=0
 s29=0
 s30=0
 s31=0
 d0=0
 d1=0
 d2=0
 d3=0
 d4=235506459545023e-220
 d5=6.75090051498673e-206
 d6=1.86761875089284e+103
 d7=7.73812704592526e+125
 d8=0 d9=4.32191080322553e+25
d10=0
d11=0
d12=0
d13=0
d14=0
d15=0
d16=0
d17=0
d18=0
d19=0
d20=0
d21=0
d22=0
d23=0
d24=nan
d25=nan
d26=nan
d27=nan
d28=0
d29 =nan
d30=3.22635709483544e-307
d31=3.22635709483544e-307
q0={0x00 0x00 0x00 0x00 0x00 0x00 0x00 0x00 000 0x00 0x00 0x00 0x00 0x00 0x00 0x00}
q1={0x00 0x00 0x00 0x00 0x00 0x00 0x00 0x00 0x00 0x00 0x00 0x00 0x00 0x00 0x00 0x00}
q2={0x4c 0x55 0x20 0x48 0x48 0x55 0x12 0x42 0xa8 0xaa 0x2a 0x8a 0xac 0x55 0x15}
q3={0x0a 0xd7 0x75 0x51 0x54 0xad 0x60 0x55 0x15 0x45 0x51 0x54 0x48 0x4a 0x12 0x5a}
q4={0x00 0x00 0x00 0x00 0x00 0x00 0x00 0x00 0x00 0xe0 0x41 0x45 0x00 0xe0 0x41 0x45}
q5={0x00 0x00 0x00 0x00 0x00 0x00 0x00 0x00 0x00 0x00 0x00 0x00 0x00 0x00 0x00 0x00}
q6={0x00 0x00 0x00 0x00 0x00 0x00 0x00 0x00 0x00 0x00 0x00 0x00 0x00 0x00 0x00 0x00}
q7={0x00 0x00 0x00 0x00 0x00 0x00 0x00 0x00 0x00 0x00 0x00 0x00 0x00 0x00 0x00 0x00}
q8={0x00 0x00 0x00 0x00 0x00 0x00 0x00 0x00 0x00 0x00 0x00 0x00 0x00 0x00 0x00 0x00}
q9={0x00 0x00 0x00 0x00 0x00 0x00 0x00 0x00 0x00 0x00 0x00 0x00 0x00 0x00 0x00 0x00}
q10={0x00 0x00 0x00 0x00 0x00 0x00 0x00 0x00 0x00 0x00 0x00 0x00 0x00 0x00 0x00 0x00}
q11={0x00 0x00 0x00 0x00 0x00 0x00 0x00 0x00 0x00 0x00 0x00 0x00 0x00 0x00 0x00 0x00}
q12={0xff 0xff 0xff 0xff 0xff 0xff 0xff 0xff 0xff 0xff 0xff 0xff 0xff 0xff 0xff 0xff}
q13={0xff 0xff 0xff 0xff 0xff 0xff 0xff 0xff 0xff 0xff 0xff 0xff 0xff 0xff 0xff 0xff}
q14={0x00 0x00 0x00 0x00 0x00 0x00 0x00 0x00 0xff 0xff 0xff 0xff 0xff 0xff 0xff 0xff}
q15={0x00 0x00 0x00 0x00 0x00 0x00 0x4d 0x00 0x00 0x00 0x00 0x00 0x00 0x00 0x4d 0x00}
fpscr=0x00000000
(lldb) process continue
Process 8212 resuming
(lldb) 2014-01-06 00:53:41.808 Example[8212:60b] Flurry: Starting session on Agent Version [Flurry_iOS$_{118\text{---}4.2.3}$]
2014-01-06 00:53:45.866 Example[8212:150b] http 0 reachability operation (reachable 0)
starting
2014-01-06 00:53:45.868 Example[8212:150b] http 0 retry wait start 0.266

2014-01-06 00:53:46.136 Example[8212:150b] http 0 retry starting
image list
[  0]    EC0C18F2-8A2B-3894-8A84-465DA1B22815 0x000b1000 /var/mobile/Applications/621B88DC-453F-43FA-9150-D0077F4F595E/Example.app/Example (0x00000000000b1000)
[  1]    FD7CB81F-388F-39CB-AC4F-71338B669C24 0x2bebf000 /usr/lib/dyld (0x000000002bebf000)
[  2]    2589E91D-4634-3E21-BB38-C16451E5BF7D 0x0138e000 /Library/MobileSubstrate/MobileSubstrate.dylib (0x000000000138e000)
[  3]    9340338F-3CDF-347A-BE4A-88C2F59B5B12 0x2c943000 /System/Library/Frameworks/Accelerate.framework/Accelerate (0x000000002c943000)
[  4]    FA30D96D-0A33-3568-826E-M5AAD83097A 0x2cf5d000 /System/Library/Frameworks/AdSupport.framework/AdSupport (0x000000002cf5d000)
[  5]    759B362F-09E5-3F37-A2EC-82372A95D1DE 0x2c818000 /System/Library/Frameworks/AVFoundation.framework/AVFoundation (0x000000002c818000)
[  6]    0211D516-9D0D-3838-A9CB-B9DD5086A312 0x2d6ab000 /System/Library/Frameworks/CoreBluetooth.framework/CoreBluetooth (0x000000002d6ab000)
[  7]    7A5F55D1-44F7-3DC5-9412-7C6469E49587 0x2dec3000 /System/Library/Frameworks/CoreMedia.framework/CoreMedia (0x000000002dec3000)
[  8]    53697E71-96F6-37CB-A323-4D37798635B2 0x2dfe4000 /System/Library/Frameworks/CoreTelephony.framework/CoreTelephony (0x000000002dfe4000)
[  9]    CFF41510-01E4-3973-9CF0-CC00E83BC254 0x2e0cd000 /System/Library/Frameworks/CoreVideo.framework/CoreVideo (0x000000002e0cd000)
[ 10]    19E2D0F6-233D-3765-ADEC-FB5BA59D9B7E 0x2e29f000 /System/Library/Frameworks/Foundation.framework/Foundation (0x000000002e29f000)
[ 11]    4E4CC0E2-DC76-3D5F-8F9C-5ED5CBC704FB 0x2f0fd000 /System/Library/Frameworks/MobileCoreServices.framework/MobileCoreServices (0x000000002f0fd000)
[ 12]    18B3A243-F792-3C39-951C-97AB416ED3E6 0x37a92000 /usr/lib/libc++.1.dylib (0x0000000037a92000)
[ 13]    FF50709F-8E04-318D-A55E-13C9096BBA03 0x37b56000 /usr/lib/libiconv.2.dylib (0x0000000037b56000)
[ 14]    719AEEAA-9CC7-301E-8EB9-117644F94B38 0x37c44000 /usr/lib/libicucore.A.dylib (0x0000000037c44000)
[ 15]    0CD7D6E0-4761-3654-80A2-078DAEE86959 0x383cc000 /usr/lib/libz.1.dylib (0x00000000383cc000)

[16] D1439922-0E74-365C-BF13-A57859A31782 0x385b2000/usr/lib/libz.1.dylib (0x00000000385b2000)

[17] CC733C2C-249E-3161-A9AF-19A44AEB1577 0x2cf5e000 /System/Library/Frameworks/AddressBook.framework/AddressBook (0x000000002d5e000)

[18] 4C426C7F-5E39-30F0-BD01-D3E1F17F0392 0x2d0d6000 /System/Library/Frameworks/AssetsLibrary.framework/AssetsLibrary (0x000000002d0d6000)

[19] F49F2879-0AA0-36C0-8E55-73071A7E2870 0x2d22c000 /System/Library/Frameworks/AudioToolbox.framework/AudioToolbox (0x000000002d22c000)

[20] 36562CFF-956F-38A0-9956-DA9218198CCF 0x2d549000 /System/Library/Frameworks/CFNetwork.framework/CFNetwork (0x000000002d549000)

[21] 34F47AD0-C4D5-3024-9298-888A1217316F 0x2d64f000 /System/Library/Frameworks/CoreAudio.framework/CoreAudio (0x000000002d64f000)

[22] 4ED490C5-FD69-3FEF-AC89-D75A47EAB553 0x2d6c2000 /System/Library/Frameworks/CoreData.framework/CoreData (0x000000002d6c2000)

[23] E13CBD41-15DC-3113-B875-DE88B92744F8 0x2d9f8000 /System/Library/Frameworks/CoreGraphics.framework/CoreGraphics (0x000000002d9f8000)

[24] 5CB9106C-8647-30E8-B36B-A1F7F14D9C7F 0x2dd65000 /System/Library/Frameworks/CoreImage.framework/CoreImage (0x000000002dd65000)

[25] BC1A8B9C-9F5D-3B9D-B79E-345D4C3A361A 0x2de3e000 /System/Library/Frameworks/CoreLocation.framework/CoreLocation (0x000000002de3e000)

[26] EE229434-1F25-3FEF-BA63-17B85A34EEF6 0x2df3b000 /System/Library/Frameworks/CoreMotion.framework/CoreMotion (0x000000002df3b000)

[27] 7EAF2F4E-AADF-382D-AFF1-3C72E6F1F3B6 0x2e03d000 /System/Library/Frameworks/CoreText.framework/CoreText (0x000000002e03d000)

[28] AF023410-57E6-3F9C-A5E2-BD15597403F7 0x2e28f000 /System/Library/Frameworks/ExternalAccessory.framework/ExternalAccessory (0x000000002e28f000)

[29] 934C186A-D02E-3012-801B-8AAD1984E5E0 0x2eb18000 /System/Library/Frameworks/MapKit.framework/MapKit (0x000000002eb18000)

[30] 59211A0F-56AC-39A7-9543-D01429EA88E2 0x2f061000 /System/Library/Frameworks/MessageUI.framework/MessageUI (0x000000002f061000)

[31] 723BF870-6F6F-3FE2-8A71-4ED9466C54AA 0x2fd87000 /System/Library/Frameworks/QuartzCore.framework/QuartzCore (0x000000002fd87000)

[32] 8D356745-D35B-357E-9C08-DC578F8B2044 0x2ff26000 /System/Library/Frameworks/Security.framework/Security (0x000000002ff26000)

[33] EE18863E-6FB3-310B-8F9D-BCA4F6BA6483 0x300b0000 /System/Library/Frameworks/SystemConfiguration.framework/SystemConfiguration (0x00000000300b0000)

[34] BAF6A06B-F43D-38B6-A5CD-265571B38343 0x30102000 /System/Library/Frameworks/UIKit.framework/UIKit (0x0000000030102000)

[35] 0CC1BF8B-5CAA-39FD-90CA-9CFC94E03FCB 0x38127000 /usr/lib/libobjc.A.dylib (0x0000000038127000)

[36] 894BC618-0768-3540-A1D4-75AE8B117140 0x38464000 /usr/lib/libstdc++.6.dylib (0x0000000038464000)

[37] DBA6762C-AA05-3E59-ABB3-1469E9B41F4B 0x37898000 /usr/lib/libSystem.B.dylib (0x0000000037898000)

[38] 37C6B3B7ABCA-3774-BEC8-FECF79F07013 0x2d8b4000 /System/Library/Frameworks/CoreFoundation.framework/CoreFoundation (0x000000002d8b4000)

[39] 479B5C47-0183-3284-AB58-7A1D2FDB5627 0x2c94d000 /System/Library/Frameworks/Accelerate.framework/Frameworks/vImage.framework/vIma ge (0x000000002c94d000)

[40] 663AEFA2-5BC5-367B-AA72-CA144AC26D18 0x2cf3c000 /System/Library/Frameworks/Accelerate.framework/Frameworks/vecLib.framework/vecLib (0x000000002cf3c000)

[41]A5DCFE68-1998-39B9-89C7-BE120C14CCB4 0x2ceba000 /System/Library/Frameworks/Accelerate.framework/Frameworks/vecLib.framework/libvDS P.dylib (0x000000002ceba000)

[42] 2E20D75C-97D3-39A2-97A2-1DE19C6A6D4B 0x37ade000 /usr/lib/libc++abi.dylib (0x0000000037ade000)

[43] 371DAD0C-8056-34AC-9AD0-3150A7BB227D 0x385bf000 /usr/lib/system/libcache.dylib (0x00000000385bf000)

[44] 95F921D9-90C9-36A2-A185-363D6D606FAE 0x385c4000 /usr/lib/system/libcommonCrypto.dylib (0x00000000385c4000)

[45] D993A286-6D6E-328A-AB22-E5218075AAFF 0x385cd000 /usr/lib/system/libcompiler_rt.dylib (0x00000000385cd000)

[46] 6E0607B0-BA0C-3B52-97BE-B5C2291803F3 0x385d2000 /usr/lib/system/libcopyfile.dylib (0x00000000385d000)

[47] 8AF5878E-FC1A-3EEB-8E3C-A9EC454855A8 0x385d9000 usr/lib/system/libcorecrypto.dylib (0x00000000385d9000)

[48] 20E9BF9F-001F-376B-AFE9-77A315D87FD7 0x38613000 /usr/lib/system/libdispatch.dylib (0x0000000038613000)
[49] 93C82BCF-DA94-398B-9979-52820E4B22BF 0x38627000 /usr/lib/system/libdyld.dylib (0x0000000038627000)
[50] D4309208-0768-3C89-9757-DF3FC70CF91A 0x38629000 /usr/lib/system/libkeymgr.dylib (0x0000000038629000)
[51] B176974A-D861-3F32-9C49-58F5A2D6BD2E 0x3862a000 /usr/lib/system/liblaunch.dylib (0x000000003862a000)
[52] 32BE9D5E-3CF3-3144-9DC7-21918FE68901 0x38631000 /usr/lib/system/libmacho.dylib (0x0000000038631000)
[53] F194A68D-448B-3E16-9B20-0917AF77A80 0x38635000 /usr/lib/system/libremovefile.dylib (0x0000000038635000)
[54] 466E30F1-D8F0-3803-9752-92042874ED17 0x38637000 /usr/lib/system/libsystem_asl.dylib (0x0000000038637000)
[55] CD492AFD4DAE-33E0-8CC1-8B6D4BFEBE1A 0x38645000 /usr/lib/system/libsystem_blocks.dylib (0x0000000038645000)
[56] BEA77857-30AD-3697-ABC8-06BD0E436BF2 0x38646000 /usr/lib/system/libsystem_c.dylib (0x0000000038646000)
[57] EEA0D8E7-5C0B-3BED-962E-0FDB654BC4DA 0x386a9000 /usr/lib/system/libsystem_configuration.dylib (0x00000000386a9000)
[58] D99F9F73-749E-302F-8EE1-5A37982262C8 0x386ac000 /usr/lib/system/libsystem_dnssd.dylib (0x00000000386ac000)
[59] 3DC1420E-94D7-33CA-BB87-11B2ACD45FEC 0x386b3000 /usr/lib/systerm/libsystem_info.dylib (0x00000000386b3000)
[60] 352B213C-6B3E-3E4F-87F4-0EEB524BAC2A 0x386cc000 /usr/lib/system/libsystem_kernel.dylib (0x00000000386cc000)
[61] 096DDC81-FBF5-3942-9DFE-0E73AFBD894F 0x386e5000 /usr/lib/system/libsystem_m.dylib (0x00000000386e5000)
[62] 56FC7958-7A40-330E-9BAE-6A276E7999FD 0x38704000 /usr/lib/system/libsystem_malloc.dylib (0x0000000038704000)
[63] 18BB09E9-A524-3A29-8528-743763EFDEA3 0x38716000 /usr/lib/system/libsystem_network.dylib (0x0000000038716000)
[64] 1D2D6D25-DB4B-3CE6-BA2F-F898554C2C6F 0x38736000 /usr/lib/system/libsystem_notify.dylib (0x0000000038736000)
[65] 544403AE-9E58-34BF-AFDE-F5250AA5DEEB 0x3873e000 /usr/lib/system/libsystem_platform.dylib (0x000000003873e000)
[66] 3B9209AD-7912-375C-9BA0-9EAF8D98F987 0x38743000 /usr/lib/system/libsystem_pthread.dylib (0x0000000038743000)
[67] 94838E06-2C2A-3F77-BF63-1BA6EB96AF85 0x38749000 /usr/lib/system/libsystem_sandbox.dylib (0x0000000038749000)
[68] CC2124D6-13D3-3E3D-B1A0-786A4B196ADF 0x3874b000 /usr/lib/system/libsystem_stats.dylib (0x000000003874b000)
[69] 6FDD98B8-0180-3591-99C8-F01AE5272F2A 0x3874e000 /usr/lib/system/libunwind.dylib (0x000000003874e000)
[70] 8AE3AA0D-5EBE-3F13-9E7B-FB4B32638D1C 0x3874f000 /usr/lib/system/libxpc.dylib (0x000000003874f000)
[71] 066EA83-2DD2-3F6D-8901-1F9A4A872D6F 0x2cbfe000 /System/Library/Frameworks/Accelerate.framework/ Frameworks/vecLib.framework/libLAPACK.dylib (0x000000002cbfe000)
[72] DA4FA367-557D-3028-B024-58E2CDF6D84D 0x2cb1b000 /System/Library/Frameworks/Accelerate.framework/ Frameworks/vecLib.framework/libBLAS.dylib (0x000000002cb1b000)
[73] EA636BBD-A5EE-3311-9A4E-731AED02FA31 0x2cf29000 /System/Library/Frameworks/Accelerate.framework/ Frameworks/vecLib.framework/libvMisc.dylib (0x000000002cf29000)
[74] BFA7A99D-236D-3196-B7AD-C1D9FDA6C48E 0x32b2c000 /System/Library/PrivateFrameworks/ManagedConfiguration.framework/ManagedConfiguration (0x0000000032b2c000)
[75] F085B254-BE9C-37D8-AC85-29E677EC6F73 0x3116c000 /System/Library/PrivateFrameworks/AppSupport.framework/AppSupport (0x000000003116c000)
[76] 5623EE43-2246-307E-B3CA-6B212542D69D 0x37d9e000 /usr/lib/liblockdown.dylib (0x0000000037d9e000)
[77] 10FFEE9D-35CC-3A3A-AFAD-5A1F3FE1E3E7 0x380ea000 (0x00000000380ea000)
[78] 6A7ED5C7-0F60-3339-BB2B-7FE8D3446D0C 0x32e1b000 /System/Library/Private-Frameworks/MobileKeyBag-.framework/MobileKeyBag (0x0000000032e1b000)
[79] D5383E33-B9C3-3CE3-9ED2-48C251C65848 0x330e7000 /System/Library/PrivateFrameworks/Netrb.framework/Netrb (0x00000000330e7000)
[80] 811F7E5D-CD35-3C57-AF6D-6DE859848774 0x2cf3d000 /System/Library/Frameworks/Accounts.framework/Accounts (0x000000002cf3d000)
[81] 7ABC8997-4A6D-3655-8D5E-FA60184E43C2 0x37865000 /usr/lib/libMobileGestalt.dylib (0x0000000037865000)
[82] 963E9B45-6DA7-301C-B752-303A69F27D10 0x325c3000 /System/Library/PrivateFrameworks/GraphicsServices.framework/GraphicsServices (0x00000000325c3000)

[83] 07B50DDB-252A-3670-AE27-C994E345D32D 0x347f1000 /System/Library/PrivateFrameworks/SpringBoardServices.framework/SpringBoardServices (0x00000000347f1000)

[84] 1137F9D6-6103-37BE-8D20-8465D7CAEA23 0x33e4c000 /System/Library/PrivateFrameworks/PersistentConnection.framework/PersistentConnection (0x0000000033e4c000)

[85] 167A3E30-59A4-355A-B50F-4B6F6CFA06A3 0x1d2f000 /System/Library/PrivateFrameworks/DataMigration.framework/DataMigration (0x0000000031d2f000)

[86] 2C6E9040-57F1-3394-B400-8615454063B7 0x2e667000 /System/Library/Frameworks/IOKit.framework/Versions/A/IOKit (0x000000002e667000)

[87] 708039AE-E4EC-3289-9E4B-BF817407798F 0x32e4b000 /System/Library/PrivateFrameworks/MobileSystemService.framework/MobileSystemServices (0x0000000032e4b000)

[88] 34A4B8EA-80E4-390A-B8A1-46E0DE95B6B1 0x37a7a000 /usr/lib/libbsm.0.dylib (0x0000000037a7a000)

[89] 810ACEE8-BEBE-3174-9211-8D752643BDE3 0x384dc000 /usr/libxml2.2.dylib (0x00000000384dc000)

[90] 06362CBA-96BF-3A67-9A91-D40F125057CC 0x37839000 /usr/lib/libCRFSuite.dylib (0x0000000037839000)

[91] 9BABF315-C8B7-39FF-98C0-78FB894BA3C4 0x37d9d000 /usr/lib/liblangid.dylib (0x0000000037d9d000)

[92] 4726833F-D7D9-357A-8BBD-D3487DCFA9C9 0x33111000 /System/Library/PrivateFrameworks/OAuth.framework/OAuth (0x0000000033111000)

[93] 851E6A2F-CA27-396A-901C-ADB1DD564305 0x31317000 /System/Library/PrivateFrameworks/BackBoardServices.framework/BackBoardServices (0x00000000031317000)

[94] E7759AB9-BB64-3390-AF3C-2AC7AD96619D 0x366e2000 /System/Library/PrivateFrameworks/XPCObjects.framework/XPCObjects (0x00000000366e2000)

[95] 38E170CD-CB58-3BC7-B091-8A9FD2D56189 0x31635000 /System/Library/PrivateFrameworks/CommonUtilities.framework/CommonUtilities (0x0000000031635000)

[96] 56F4820A-03DA-3B71-BC7E-A2114E81060D 0x37904000 /usr/lib/libTelephonyUntilDynamic.dylib (0x0000000037904000)

[97] 0925EFAB-4DD3-38E3-82AA-5810CDBED33F 0x2c91a000 /System/Library/Frameworks/AVFoundation.framework/libAVFAudio.dylib (0x000000002c91a000)

[98] 80730D8E-AE03-38D0-A992-404F584240BF 0x2eda7000 /System/Library/Frameworks/MediaToolbox.framework/MediaToolbox (0x000000002eda7000)

[99] D492AA96-C294-3EAC-8778-E41F740527AA 0x30824000 /System/Library/Frameworks/VideoToolbox.framework/VideoToolbox (0x0000000030824000)

[100] E21CABFE-CF2D-32C6-A1BB-6DC116823481 0x3140f000 /System/Library/PrivateFrameworks/Celestial.framework/Celestial (0x000000003140f000)

[101] C734CA27-E347-327B-A351-C6C6DEAB91F7 0x329e9000 /System/Library/PrivateFrameworks/IOSurface.framework/IOSurface (0x00000000329e9000)

[102] A913973D-7CC3-3C0E-84CF-D8479CACCB66 0x2e6be000 /System/Library/Frameworks/ImageIO.framework/ImageIO (0x000000002e6be000)

[103] B1DA50D9-89D8-3BC5-8E0A-932471D82C1D 0x312c9000 /System/Library/PrivateFrameworks/AssetsLibraryServices.framework/AssetsLibraryServices (0x00000000312c9000)

[104] F8C17515-7B1F-3E59-8EA6-036CB4E0FD97 0x344a8000 /System/Library/PrivateFrameworks/Quagga.framework/Quagga (0x00000000344a8000)

[105] B14719F4-F921-3DB6-BF03-5E9DD349691C 0x34be3000 /System/Library/PrivateFrameworks/TCC.framework/TCC (0x0000000034be3000)

[106] 616F9B31-BE71-3911-A957-96404A700035 0x31313000 /System/Library/PrivateFrameworks/BTLEAudioController.framework/BTLEAudioController 0x0000000031313000)

[107] BC6C1698-BE99-3D0B-9BE9-016CF2A89A8A 0x31b11000 /System/Library/PrivateFrameworks/CrashReporterSupport.framework/CrashReporterSupport (0x0000000031b11000)

[108] 8CADAF26-0E5C-331A-98F0-CBC94EFBC6A6 0x355a9000 /System/Library/PrivateFrameworks/UserFS.framework/UserFS (0x00000000355a9000)

[109] 0F2DE9EB-7F61-39DE-8A51-BA3ECCBEC8D2 0x31d95000 /System/Library/PrivateFrameworks/ExFAT.framework/ExFAT (0x0000000031d95000)

[110] CBA26F9F-5C91-34C9-8BFC-1B2953BF8B66 0x2fb94000 /System/Library/Frameworks/OpenGLES.framework/OpenGLES (0x000000002fb94000)

[111] 61521D68-95EB-360B-9587-478AA39A149D 0x2fba6000 /System/Library/Frameworks/OpenGLES.framework/libGFXShared.dylib (0x000000002fba6000)

[112] C66DABCB-BC53-3CFD-9B28-F2544B71B8CD 0x329e1000 /System/Library/PrivateFrameworks/IOMobileFramebuffer.framework/IOMobileFramebuffer (0x00000000329e1000)

[113] CD3ACA6F-F56C-330A-B703-2D420E0017CA 0x2fbae000 /System/Library/Frameworks/OpenGLES.framework/libGLImage.dylib (0x000000002fbae000)
[114] 5C255052-C907-399E-B020-1EA98DD2855A 0x2fb9e000 /System/Library/Frameworks/OpenGLES.framework/libCVMSPluginSupport.dylib (0x000000002fb9e000)
[115] 0A471BE0-53A4-3E1C-A78E-79DEFAA47AD1 0x2fba2000 /System/Library/Frameworks/OpenGLES.framework/libCoreVMClient.dylib (0x000000002fba2000)
[116] C9312D9C-3C47-3019-835A-71B356145C9A 0x319c0000 /System/Library/PrivateFrameworks/CoreSurface.framework/CoreSurface (0x00000000319c0000)
[117] 6B18E226-CDAE-3E4D-BFB3-B6B826E26F8F 0x2ebbc000 /System/Library/Frameworks/MediaAccessibility.framework/MediaAccessibility (0x000000002ebbc000)
[118] 28A54CC5-2533-3D80-A2D0-E882A8E63243 0x330ed000 /System/Library/PrivateFrameworks/NetworkStatistics.framework/NetworkStatistics (0x00000000330ed000)
[119] D271B13E-B5C0-3C8D-ACB1-54BB867E39F7 0x30be5000 /System/Library/PrivateFrameworks/AggregateDictionary.framework/AggregateDictionary (0x0000000030be5000)
[120] FF394195-6263-313F-BBA3-4757305DBCB0 0x32ba8000 /System/Library/PrivateFrameworks/MediaControlSender.framework/MediaControlSender (0x0000000032ba8000)
[121] 64F930DE-4055-3F1B-9414-68839BB35795 0x34a1c000 /System/Library/PrivateFrameworks/StoreServices.framework/StoreServices (0x0000000034a1c000)
[122] BE171F81-DB45-3C56-80EE-38B862362F83 0x3170d000 /System/Library/PrivateFrameworks/CoreAUC.framework/CoreAUC (0x000000003170d000)
[123] 5F6DC798-E398-32C1-AB4C-F554668CE7EA 0x32c58000 /System/Library/PrivateFrameworks/MediaRemote.framework/MediaRemote (0x0000000032c58000)
[124] 59C298C0-93E6-3AC8-ADE7-46AA2AD0FE44 0x32e6d000 /System/Library/PrivateFrameworks/MobileWiFi.framework/MobileWiFi (0x0000000032e6d000)
[125] D07E0341-714E-369F-BA98-0E2E16702831 0x31ac3000 System/Library/PrivateFrameworks/CoreUtils.framework/CoreUtils (0x0000000031ac3000)
[126] D1B431C5-E918-342B-95E6-F89CAE386684 0x31406000 /System/Library/PrivateFrameworks/CaptiveNetwork.framework/CaptiveNetwork (0x0000000031406000)
[127] 460BFB71-241D-33EA-9D9E-191EC0CB69C7 0x31d6f000 /System/Library/PrivateFrameworks/EAP8021X.framework/EAP8021X (0x0000000031d6f000)
[128] A81C3C35-BCE5-399D-9F13-08FF85AEAA73 0x32e17000 /System/Library/PrivateFrameworks/MobileInstallation.framework/MobileInstallation (0x0000000032e17000)
[129] F94BBC49-9D1A-3C13-A966-14A0DC2A8E62 0x31343000 /System/Library/PrivateFrameworks/Bom.framework/Bom (0x0000000031343000)
[130] B246A3F7-A524-3BE1-89AF-E4F7582042FA 0x37a87000 /usr/lib/libbz2.1.0.dylib (0x0000000037a87000)
[131] 84B62D5C-98AC-3914-BF90-CB356D0FE875 0x3242a000 /System/Library/PrivateFrameworks/GeoServices.framework/GeoServices (0x000000003242a000)
[132] 5B4E6B3F-DA35-3385-8256-4205C2124948 0x3446c000 /System/Library/PrivateFrameworks/ProtocolBuffer.framework/ProtocolBuffer (0x000000003446c000)
[133] C3ED062E-34C0-3EC2-99D5-779A97D2DF24 0x3133d000 /System/Library/PrivateFrameworks/BluetoothManager.framework/BluetoothManager (0x000000003133d000)
[134] 4D8E6011-ACA1-3A05-8FE6-A7988AB3E1D4 0x32df4000 /System/Library/PrivateFrameworks/MobileBluetooth.framework/MobileBluetooth (0x0000000032df4000)
[135] 16E4C6B2-B55E-3644-B4BC-C9EF328153A8 0x31cdf000 /System/Library/PrivateFrameworks/DataAccessExpress.framework/DataAccessExpress (0x0000000031cdf000)
[136] BB5B6BDD-49E6-36FB-BEAC-1E8FAD45A41C 0x33fd6000 /System/Library/PrivateFrameworks/PhotoLibraryServices.framework/PhotoLibraryServices (0x0000000033fd6000)
[137] FEE8931F-425F-38AF-8FBD-E0388890EC52 0x37863000 /usr/lib/libMobileCheckpoint.dylib (0x0000000037863000)
[138] 444E19E3-C43D-32AA-AAD0-F4050A876844 0x317b1000 /System/Library/PrivateFrameworks/CoreMediaStream.framework/CoreMediaStream (0x00000000317b1000)
[139] 20FB650D-829F-321E-A9A9-A1F48789015E 0x32c63000 /System/Library/PrivateFrameworks/MediaStream.framework/MediaStream (0x0000000032c63000)
[140] 6129F107-3A91-3C30-A4FF-B1D88DE9EF07 0x34806000 /System/Library/PrivateFrameworks/SpringBoardUI.framework/SpringBoardUI (0x0000000034806000)

[141] B0E8F70F-8CC1-35D3-A964-E505323C8481 0x32759000 /System/Library/PrivateFrameworks/IDS.framework/IDS (0x0000000032759000)
[142] A7BEE526-3B62-370C-82AC-8A8125F8BC18 0x32aa7000 /System/Library/PrivateFrameworks/MMCS.framework/MMCS (0x0000000032aa7000)
[143] B76D261F-A68B-3008-BF16-1559012E8A9A 0x32ba6000 /System/Library/PrivateFrameworks/Marco.framework/Marco (0x0000000032ba6000)
[144] 2E56E963-50C7-33ED-8FC9-EB2DC065D718 0x3297d000 /System/Library/PrivateFrameworks/IMFoundation.framework/IMFoundation (0x000000003297d000)
[145] 4802C0E9-4FA2-3451-95B3-18824BF0FBAE 0x327fa000 /System/Library/PrivateFrameworks/IDSFoundation.framework/IDSFoundation (0x00000000327fa000)
[146] E1835ECD-46EB-3FC8-9453-74BA7D5997AA 0x31db5000 /System/Library/PrivateFrameworks/FTServices.framework/FTServices (0x0000000031db5000)
[147] BD1B516E-30AA-337B-92CB-086936B93D6A 0x31d37000 /System/Library/PrivateFrameworks/DiagnosticLogCollection.framework/DiagnosticlogCollection (0x0000000031d37000)
[148] 9AC4925F-9E80-3E48-A846-AE28ABA6D355 0x384b2000 /usr/lib/libtidy.A.dylib (0x00000000384b2000)
[149] 9C0F1F68-2D4F-38E5-904E-B1309F522E53 0x315c4000 /System/Library/PrivateFrameworks/Chunkinglibrary.framework/ChunkingLibrary (0x00000000315c4000)
[150] F773BA9A-776E-3551-B2FF-49F656AFC9EC 0x31281000 /System/Library/PrivateFrameworks/ApplePushService.framework/ApplePushService (0x0000000031281000)
[151] B8F2A05E-B58A-3EA9-AD4EE-C860ABEBACF9 0x366db000 /System/Library/PrivateFrameworks/XPCKit.framework/XPCKit 0x00000000366db000)
[152] 2C7DFF57-3D62-3D5F-AD64-D1218A6D3D45 0x311aa000 /System/Library/PrivateFrameworks/AppleAccount.framework/AppleAccount (0x00000000311aa000)
[153] E046709C-9DCF-397B-AF74-853C24016E3D 0x30aba000 /System/Library/PrivateFrameworks/AOSNotification.framework/AOSNotification (0x0000000030aba000)
[154] E89B7ABC-027C-3994-B956-836330D4E709 0x32aed000 /System/Library/PrivateFrameworks/MailServices.framework/MailServices (0x0000000032aed000)
[155] D23DA186-6A54-3EEC-8206-5617C4BCCAD2 0x32db7000 /System/Library/PrivateFrameworks/MessageSupport.framework/MessageSupport (0x0000000032db7000)
[156] 5CF83A53-7BEA-3247-A2EB-B5A2E73A1EF7 0x347c8000 /System/Library/PrivateFrameworks/SpringBoardFoundation.framework/SpringBoardFoundation (0x00000000347c8000)
[157] 061BA80C-86F0-310E-9927-1A2F6B586A69 0x34820000 /System/Library/PrivateFrameworks/SpringBoardUIServices.framework/SpringBoardUIServices (0x0000000034820000)
[158] E1C65C22-8F4E-35DA-8F15-C332DCE09ED8 0x34be6000 /System/Library/PrivateFrameworks/TelephonyUI.framework/TelephonyUI (0x0000000034be6000)
[159] 8F36DC0C-C40A-352E-8734-C81F6A4ECCF2 0x3137a000 /System/Library/PrivateFrameworks/BulletinBoard.framework/BulletinBoard (0x000000003137a000)
[160] 8E172E07-EC7F-3F2B-8602-0EE6FA3698CB 0x3546e000 /System/Library/PrivateFrameworks/ToneLibrary.framework/ToneLibrary (0x000000003546e000)
[161] 20F984D5-C691-3227-9268-5361651C3AB0 0x34477000 /System/Library/PrivateFrameworks/PrototypeTools.framework/PrototypeTools (0x0000000034477000)
[162] B4D1D18A-F202-3E42-B8BC-5BF94E134DD1 0x354d1000 /System/Library/PrivateFrameworks/UIFoundation.framework/UIFoundation (0x0000000035441000)
[163] 40D69632-4564-353E-981F-4F8BA480586F 0x31a68000 /System/Library/PrivateFrameworks/CoreUI.framework/CoreUI (0x0000000031a68000)
[164] 5129443F-89F9-3723-8576-308808E62124 0x32dc5000 /System/Library/PrivateFrameworks/MobileAsset.framework/MobileAsset (0x0000000032dc5000)
[165] 452C1561-0448-3FC3-AEA8-5EBAF9F5C734 0x34c2f000 /System/Library/PrivateFrameworks/TelephonyUtilities.framework/TelephonyUtilities (0x0000000034c2f000)
[166] F74A317E-4672-339B-ABC6-103959DF3472 0x31d39000 /System/Library/PrivateFrameworks/DictionaryServices.framework/DictionaryServices (0x0000000031d39000)
[167] A8DD8943-19EF-3742-B7D8-C75764E2279C 0x35252000 /System/Library/PrivateFrameworks/Textinput.framework/Textinput (0x0000000035252000)
[168] 2D9A513D-87BD-3C2D-8DE0-098DF694485C 0x364db000 /System/Library/PrivateFrameworks/WebKit.framework/WebKit (0x00000000364db000)

[169] 7DF88F9A-F792-3175-8F97-431994AD6BE8 0x35a2c000 /System/Library/PrivateFrameworks/WebCore.framework/WebCore (0x0000000035a2c000)
[170] FB8E3974-48FE-3CF7-B655-9AFD96572CB2 0x343e4000 /System/Library/PrivateFrameworks/ProofReader.framework/ProofReader (0x00000000343e4000)
[171] 652DEE07-B3FE-371F-B823-0AEE2C9537B4 0x37639000 /usr/lib/libAccessibility.dylib (0x0000000037639000)
[172] 6BC12FE7-B637-39E7-9D7D-BA91A4F2560C 0x343a9000 /System/Library/PrivateFrameworks/PrintKit.framework/PrintKit (0x00000000343a9000)
[173] 8FA2FCDC-554D-387F-A59E-A688840048D0 0x3428d000 /System/Library/PrivateFrameworks/PhysicsKit.framework/PhysicsKit (0x000000003428d000)
[174] D7EA5F75-FC10-3FE2-8436-F1180FFA98A6 0x3386b000 /System/Library/PrivateFrameworks/OpenCL.framework/OpenCL (0x000000003386b000)
[175] E767863D-AC8A-3D79-8877-DE0A07624BA9 0x31ddf000 /System/Library/PrivateFrameworks/FaceCore.framework/FaceCore (0x0000000031ddf000)
[176] AA607172-94D6-3CE8-B3D6-CE3E62350308 0x31641000 /System/Library/PrivateFrameworks/CommunicationsFilter.framework/CommunicationsFilter (0x0000000031641000)
[177] E3269CF2-4608-3558-8F0E-9B8F5BED13B2 0x38590000 /usr/lib/libxslt.1.dylib (0x0000000038590000)
[178] 54F2231E-A9E4-3666-BEFD-DCDC18A910EB 0x2e8cf000 /System/Library/Frameworks/JavaScriptCore.Framework/JavaScriptCore (0x000000002e8cf000)
[179] DA95BEE5-FFF1-3F04-9A1D-5CA4C137F6E6 0x314f6000 /System/Library/PrivateFrameworks/CertUI.framework/CertUI (0x00000000314f6000)
[180] 763DDFFB-38AF-3444-B745-01DDE37A5949 0x3838e000 /usr/lib/libresolv.9.dylib (0x000000003838e000)
[181] 7B7DCCA6-AC76-3977-A541-C749928B6612 0x2e48a000 /System/Library/Frameworks/GLKit.framework/GLKit (0x000000002e48a000)
[182] 8005F7C5-FEEC-39AE-8A78-9D8E4FB5E537 0x32a3b000 /System/Library/PrivateFrameworks/IncomingCallFilter.framework/incomingCallFilter (0x0000000032a3b000)
[183] 2571D3D4-3007-33E8-9659-03AD4B55AAC0 0x31a63000 /System/Library/PrivateFrameworks/CoreTime.framework/CoreTime (0x0000000031a63000)
[184] 45B9FD8A-BAC3-34E7-ADC6-17A75ACBEDB3 0x326e7000 /System/Library/PrivateFrameworks/IAP.framework/IAP (0x00000000326e7000)
[185] 16FA2403-57AB-3113-A02F-6971195CCE29 0x355c2000 /System/Library/PrivateFrameworks/VectorKit.framework/VectorKit (0x00000000355c2000)
[186] 07861158-7D1F-3E61-BAB8-3EE96F53E909 0x30dfc000 /System/Library/PrivateFrameworks/Altitude.framework/Altitude (0x0000000030dfc000)
[187] CD6105F6-6A03-3D06-AFB4-5CF2CA3C1644 0x37da9000 /usr/lib/liblzma.5.dylib (0x0000000037da9000)
[188] 42095BC3-3BC8-335A-9398-FF3CEF2D3340 0x31949000 /System/Library/PrivateFrameworks/CoreRecents.framework/CoreRecents (0x0000000031949000)
[189] DC622C6E-6553-3D19-9F7B-20494596C202 0x31db2000 /System/Library/PrivateFrameworks/FTClientServices.framework/FTClientServices (0x0000000031db2000)
[190] 8F681556-D73D-3EE5-B9BF-EAD2A124927C 0x2cfc4000 /System/Library/Frameworks/AddressBookUI.framework/AddressBookUI (0x000000002cfc4000)
[191] 27616C0C-FE2C-37AB-B470-339564F221F8 0x32ce0000 /System/Library/PrivateFrameworks/Message.framework/Message (0x0000000032ce0000)
[192] C5260F7D-4EAC-39F8-8BDC-F08E06E8646C 0x31b17000 /System/Library/PrivateFrameworks/DataAccess.framework/DataAccess (0x0000000031b17000)
[193] 7BD8ADB8-7A31-3533-958C-9C56FF251FE8 0x2e0dd000 /System/Library/Frameworks/EventKit.framework/EventKit (0x000000002e0dd000)
[194] 95BE12E7-EEB6-3D12-A06C-3726FA32BC60 0x32a6d000 /System/Library/PrivateFrameworks/MIME.framework/MIME (0x0000000032a6d000)
[195] 68ED4805-C8B5-3610-9FCC-1683E013B5A6 0x2fecd000 /System/Library/Frameworks/QuickLook.framework/QuickLook (0x000000002fecd000)
[196] DAFC2E13-A756-3017-8D29-CBEF36104AA3 0x32871000 /System/Library/PrivateFrameworks/IMCore.framework/IMCore (0x0000000032871000)
[197] 5022D05F-42F3-3597-8473-79F7669774B4 0x316dc000 /System/Library/PrivateFrameworks/ContentIndex.framework/ContentIndex (0x00000000316dc000)
[198] FD8A01D8-7560-38D7-86CE-CF1BB73D8881 0x342bb000 /System/Library/PrivateFrameworks/PowerLog.framework/PowerLog (0x00000000342bb000)

[199] 4D200A2B-0C84-314F-9132-6A90D439470C 0x359f1000 /System/Library/PrivateFrameworks/WebBookmarks.framework/WebBookmarks (0x00000000359f1000)

[200] 25C772FC-08CD-3352-8E38-DC8F845D53C4 0x3688e000 /System/Library/PrivateFrameworks/iCalendar.framework/iCalendar (0x000000003688e000)

[201] EDD5BD48-98D2-3BB7-8864-C93C41A36EC4 0x330f3000 /System/Library/PrivateFrameworks/Notes.framework/Notes (0x00000000330f3000)

[202] 096F501A-43B2-3126-BCCB-0154954E66DA 0x3171c000 /System/Library/PrivateFrameworks/CoreDAV.framework/CoreDAV (0x000000003171c000)

[203] 00C5C448-7727-301F-9396-8F4861ED71F7 0x2ebc1000 /System/Library/Frameworks/MediaPlayer.framework/MediaPlayer (0x000000002ebc1000)

[204] 802751BB-2F21-301A-AA84-6B7AF966A257 0x30de7000 /System/Library/PrivateFrameworks/AirTraffic.framework/AirTraffic (0x0000000030de7000)

[205] 889C8D35-142A-3839-B8F9-F6FFF0C28C42 0x36a8d000 /System/Library/PrivateFrameworks/iTunesStore.framework/iTunesStore (0x0000000036a8d000)

[206] 4E06485D-6C52-3AFB-A3F2-FFD843CCFF75 0x34647000 /System/Library/PrivateFrameworks/SAObjects.framework/SAObjects (0x0000000034647000)

[207] D32405F1-6040-365E-9FA9-5FC9C38D9014 0x32eaf000 /System/Library/PrivateFrameworks/MusicLibrary.framework/MusicLibrary (0x0000000032eaf000)

[208] 38A2966E-2AE4-3246-81FB-BFC0B8EE7AF4 0x3451d000 /System/Library/PrivateFrameworks/Radio.framework/Radio (0x000000003451d000)

[209] DEB893F5-C4D9-3457-AAE2-A2DA054DBD35 0x32660000 /System/Library/PrivateFrameworks/HomeSharing.framework/HomeSharing (0x0000000032660000)

[210] 83CB00B6-AF82-3B69-B66F-EF04A2B921BB 0x32360000 /System/Library/PrivateFrameworks/Librarian.framework/Librarian (0x0000000032a60000)

[211] B898E996-D6D6-37B3-8398-E5345C0BB7D4 0x35592000 /System/Library/PrivateFrameworks/Ubiquity.framework/Ubiquity (0x0000000035592000)

[212] 02B0C943-F582-373C-BCA3-C0881D9B172C 0x3241d000 /System/Library/PrivateFrameworks/GenerationalStorage.framework/GenerationalStorage (0x000000003241d000)

[213] 51F10D7D-E8D3-3AC5-AF35-F1DFDBE3BE42 0x34b35000 /System/Library/PrivateFrameworks/StreamingZip.framework/StreamingZip (0x0000000034b35000)

[214] 3B247B24-B05B-31BA-824F-D703217BE8AA 0x37b3b000/user/lib/libgcc_s.1.dylib (0x0000000037b3b000)

[215] 3C06BD00-7BE5-3EB6-A854-07A9E9D9BA2A 0x013e0000 /Library/Frameworks/CydiaSubstrate.framework/Libraries/SubstrateLoader.dylib (0x00000000013e0000)

[216] 24872822-B56D-30F4-B88C-83448F3DB656 0x01409000 /Library/MobileSubstrate/DynamicLibraries/Activator.dylib (0x0000000001409000)

[217] 96F12368-F66D-374C-ADF6-6F01953B12ED 0x01554000 /Library/MobileSubstrate/DynamicLibraries/DisplayRecorder.dylib (0x0000000001554000)

[218] 8A656161-1667-3856-82A9-6916B889C319 0x01564000 /Library/MobileSubstrate/DynamicLibraries/SS-LKillSwitch.dylib (0x0000000001564000)

[219] 43CFFE2E-1D50-397F-9C83-B58CF610C6FF 0x01567000 /Library/Frameworks/CydiaSubstrate.framework/CydiaSubstrate (0x0000000001567000)

[220] 617A7994-F92A-30DC-BFC3-E90EBABE78B0 0x2c4f9000 /System/Library/AccessibilityBundles/AccessibilitySettingsLoader.bundle/AccessibilitySettingsLoader (0x000000002c4f9000)

[221] 55CF6F91-6F61-3E10-B5C1-E0CFCEE0B745 0x37633000 /usr/lib/libAXSpeechManager.dylib (0x0000000037633000)

[222] 0B8750A1-C6F6-3B86-9E6E-3BC5925BEF1E 0x30b27000 /System/Library/PrivateFrameworks/AccessibilityUtilities.framework/AccessibilityUtilities (0x0000000030b27000)

[223] 097A677E-599C-3C9B-88EC-1DA30AF3A3F2 0x35277000 /System/Library/PrivateFrameworks/TextToSpeech.framework/TextToSpeech (0x0000000035277000)

[224] 3C247CF5-F0A1-377A-8483-6C69E95D7F4F 0x37631000 /usr/lib/libAXSafeCategoryBundle.dylib (0x0000000037631000)

[225] EB1C15AC-ABEF-3282-95C1-640CBF8F99FB 0x346d4000 /System/Library/PrivateFrameworks/ScreenReaderCore.framework/ScreenReaderCore (0x00000000346d4000)

[226] 17240727-741-3340-84EA-724AC3678C13 0x319c2000 /System/Library/PrivateFrameworks/CoreSymbolication.framework/CoreSymbolication (0x00000000319c2000)

[227] DAF3815B-22ED-3301-A9D9-71417C9CCA54 0x036b9000 /System/Library/AccessibilityBundles/UIKit.axbundle/UIKit (0x00000000036b9000)

[228] DEE10DF0-5F00-3E6C-B508-7F72E22A0A6D 0x318b0000
/System/Library/PrivateFrameworks/CorePDFframework/ CorePDF (0x00000000318b0000)
[229] 5FA6DFFB-AED2-3728-BFD2-35A294D82231 0x354a9000
System/Library/PrivateFrameworks/UIAccessibility.framework/UIAccessibility
(0x00000000354a9000)
[230] A2808D73-9D08-3291-A06B-A9061A68B6AB 0x30af0000
/System/Library/PrivateFrameworks/AXRuntime.framework/AXRuntime
(0x0000000030af0000)
[231] FB76F799-02B9-331C-A681-66B93935564E 0x31cfe000
/System/Library/PrivateFrameworks/DataDetectorsCore.framework/DataDetectorsCore
(0x0000000031cfe000)
[232] AFB354EF-CB36-32DA-B668-30CDA08C985F 0x037be000
/System/Library/AccessibilityBundles/AddressBookUIFramework.axbundle/AddressBookUIFramework
(0x00000000037be000)
[233] ECFBBA28-0B59-3A33-8BBD-0E52E62E4C5A 0x037d2000
/System/Library/AccessibilityBundles/TelephonyUIFramework.axbundle/TelephonyUIFramework
(0x00000000037d2000)
[234] 6FE0DAF2-E283-30C6-A6A9-6B3853008BB0 0x037e4000
/System/Library/AccessibilityBundles/MapKitFramework.axbundle/MapKitFramework
(0x00000000037e4000)
[235] 3558ED92-C6EF-3AEA-9548-28D69C485CA3 0x013ce000
/System/Library/AccessibilityBundles/GeoServices.axbundle/GeoServices
(0x00000000013ce000)
[236] 0F5260B3-B583-3C24-96FB-D1D0D3D71116 0x03607000
/System/Library/AccessibilityBundles/iTunesStoreFramework.axbundle/iTunesStoreFramework
(0x0000000003607000)
[237] 83F4C122-5234-3B01-8739-F2A304E5F8AF 0x037f4000
/System/Library/AccessibilityBundles/SpringBoardFoundation.axbundle/SpringBoardFoundation
(0x00000000037f4000)
[238] FE07E637-D95C-38CD-B801-1A61F75AE888 0x037f8000
/System/Library/AccessibilityBundles/MessageUIFramework.axbundle/MessageUIFramework
(0x00000000037f8000)
[239] AD5648B7-B0FB-3CF2-9B14-CA6B27A95232 0x0380a000
/System/Library/AccessibilityBundles/QuickLook.axbundle/QuickLook
(0x000000000380a000)
[240] 9425434C-58E0-31EA-B3EA-8A7D60DAF42D 0x0380e000
/System/Library/AccessibilityBundles/SpringBoardUIServices.axbundle/SpringBoardUIServices
(0x000000000380e000)
[241] 0ECAE7D8-E051-3016-BD35-57FCCF2B8B2E 0x03812000
/System/Library/AccessibilityBundles/MediaPlayerFramework.axbundle/MediaPlayerFramework
(0x0000000003812000)
[242] 6DEA3443-0506-330B-997F-9AC1D8512359 0x03827000
/System/Library/AccessibilityBundles/VectorKit.axbundle/VectorKit (0x0000000003827000)
[243] 4BE02E43-7390-3A7D-8295-E4E0859326AB 0x2db1e000
/System/Library/Frameworks/CoreGraphics.framework/Resources/libCGFreetype.A.dylib
(0x000000002db1e000)
[244] 40D9D1AD-2773-38AC-900B-7D97B26C6575 0x2dd4a000
/System/Library/Frameworks/CoreGraphics.framework/Resources/libRIP.A.dylib
(0x000000002dd4a000)
[245] 23411D17-163A-3526-9E92-3C9D1A21F1B6 0x2db5b000
/System/Library/Frameworks/CoreGraphics.framework/Resources/libCMSBuiltin.A.dylib
(0x000000002db5b000)
[246] 2FAB5A99-33E7-30B3-8074-4F325B384E30 0x3787b000
/usr/lib/libMobileGestaltExtensions.dylib
(0x000000003787b000)
[247] 9C1C3461-3680-340C-B8B7-EE3B8F12A08F 0x319a1000
/System/Library/PrivateFrameworks/CoreServicesInternal.framework/CoreServicesInternal
(0x00000000319a1000)
[248] BF399F99-756E-3FA9-92C2-C0D7F2EB0049 0x2c5bb000
/System/Library/CoreServices/RawCamera.bundle/RawCamera (0x000000002c5bb000)
[249] 18D59BD8-A806-372E-B344-995FB13176BB 0x04100000
/usr/lib/librocketbootstrap.dylib (0x0000000004100000)
[250] C28EABE2-A516-358F-848B-7A22379100E7 0x37b08000 /usr/lib/libcupolicy.dylib
(0x0000000037b08000)
(lldb) 2014-01-06 00:53:47.936 Example[8212:150b] http 0 reachability operation done
2014-01-06 00:53:47.939 Example[8212:60b] Initializing minesweeper!
process interrupt
Process 8212 stopped
* thread #1: tid=0x82bb1, 0x386cca84 libsystem_kernel.dylib'mach_msg_trap+20, queue ='com.apple.main-thread, stop reason=signal SIGSTOP
    frame #0: 0x386cca84 libsystem_kernel.dylib'mach_msg_trap+20
libsystem_kernel.dylib'mach_msg_trap+20
    >0x386cca84: pop {r4, r5, r6, r8}
    0x386cca88: bx lr
libsystem_kernel.dylib'mach_msg_overwrite_trap:
    0x386cca8c: mov r12, sp
    0x386cca90: push {r4, r5, r6, r8}
(lldb) po [[UIApp keyWindow] recursiveDescription]
<UIWindow: 0x15612c80; frame=(0 0; 768 1024); gestureRecognizers=<NSArray:
0x15612860>; layer=<UIWindowLayer: 0x15612a20>>
  | <UIView: 0x15611500; frame=(0 0; 768 1024); autoresize=W+H; layer=<CALayer: 0x156115a0>>
  |   | <UILayoutContainerView: 0x1560a080; frame=(0 0; 768 1024); autoresize=W+H;

gestureRecognizers=<NSArray: 0x15744a70>; layer=<CALayer: 0x1560f800>>
| | |<UINavigationTransitionView: 0x1560aa0; frame=(0 0; 768 1024);
clipsToBounds=YES; autoresize=W+H; layer=<CALayer: 0x156009f0>>
| | | |<UIViewControllerWrapperView: 0x15589340; frame=(0 0; 768 1024);
autoresize=W+H; layer=<CALayer: 0x15589400>>
| | | | |<UIView: 0x15753270; frame=(0 0; 768 1024); autoresize=W+H; layer=<CALayer: 0x157532d0>>
| | | | | |<UIView: 0x15750cc0; frame=(0 0; 768 1024); autoresize W+H; layer =<CALayer: 0x15750f00>>
| | | | | | |<UIImageView: 0x1574a210; frame=(−20−20; 808 1064); autoresize =W+H; userInteractionEnabled=NO; animations={<UIInterpolatingMotionEffect: 0x15524ca0>=<CABasicAnimation: 0x1551e300>; <UIInterpolatingMotionEffect: 0x15525a30>=<CABasicAnimation: 0x1551e4a0>; }; layer=<CALayer: 0x1574a2a0>>-(null)
| | | | | | |<UIImageView: 0x15750430; frame=(0 0; 768 1024); alpha=0; autoresize=W+H; userInteractionEnabled=NO; layer=<CALayer: 0x157505b0>>-(null)
| | | | | | |<UIImageView: 0x15751550; frame=(0 0; 768 1024); autoresize=W+H; userInteractionEnabled=NO; layer=<CALayer: 0x15751fa0>>-(null)
| | | | | | |<UIView: 0x1574d0f0; frame=(0 60; 768 279); autoresize=W+BM; layer=<CALayer: 0x1574c1170
| | | | | | | |<FQButton: 0x15748b40; baseClass=UIButton; frame=(120 203; 530 72); opaque=NO; autoresize=RM+BM; layer=<CALayer: 0x15748c60>>
| | | | | | | | |<UIImageView: 0x15527d50; frame=(0 0; 530 72); clipsToBounds=YES; opaque=NO; userInteractionEnabled=NO; layer=<CALayer: 0x1552a070>>-(null)
| | | | | | | | |<UIButtonLabel: 0x15748dc0; frame=(231 23; 68 26); text='Sign In'; clipsToBounds=YES; opaque=NO; userInteractionEnabled=NO; layer=<CALayer: 0x15748e70>>
| | | | | | | |<FQButton: 0x15745da0; baseClass=UIButton; frame=(120 113; 530 72); opaque=NO; autoresize=RM+BM; layer=<CALayer: 0x15745f40>>
| | | | | | | | |<UIImageView: 0x1552f140; frame=(0 0; 530 72); clipsToBounds=YES; opaque=NO; userInteractionEnabled=NO; layer=<CALayer: 0x1552f8a0>>-(null)
| | | | | | | | |<UIButtonLabel: 0x15746be0; frame=(161 23; 208 26); text='New Example Account'; clipsToBounds=YES; opaque=NO; userInteractionEnabled=NO; layer=<CALayer: 0x15746d10>>
| | | | | | | |UILabel: 0x1574c850; frame=(20 51; 728 30); text='Accept credit cards.Run . . . '; opaque=NO; autoresize=LM+RM+BM; userInteractionEnabled=NO; layer=<CALayer: 0x1574c240>>
| | | | | | | |<UIImageView: 0x1574de30; frame=(20 0; 728 53); autoresize=LM+RM+BM; userInteractionEnabled=NO; layer=<CALayer: 0x1574dec0>>-(null)
| | | | | |<UIImageView: 0x1574fdd0; frame=(76.8 102.4; 614.4 819.2); transform=[0.80000001, 0, 0, 0.80000001, 0, 0]; alpha=0; autoresize=W+H; userInteractionEnabled=NO; layer=<CALayer: 0x1574fd40>>-(null)
(lldb) bt all
*thread #1: tid=0x82bb1, 0x386cca84 libsystem_kernel.dylib'mach_msg_trap+20, queue ='com.apple.main-thread, stop reason=signal SIGSTOP
    frame #0: 0x386cca84 libsystem_kernel.dylib'mach_msg_trap+20
    frame #1: 0x386cc880 libsystem_kernel.dylib'mach_msg+40
    frame #2: 0x2d953558 CoreFoundation'<redacted>+156
    frame #3: 0x2d951cbe CoreFoundation'<redacted>+862
    frame #4: 0x2d8bc470 CoreFoundation'CFRunLoopRunSpecific+524
    frame #5: 0x2d8bc252 CoreFoundation'CFRunLoopRuninMode+106
    frame #6: 0x325ca2ea GraphicsServices'GSEventRunModal+138
    frame #7: 0x30171844 UIkit'UIApplicationMain+1136
    frame #8: 0x000b633c Example'main+76
thread #2: tid 0x82c50, 0x386cc838 libsystem_kernel.dylib'kevent64+24, queue='com.apple.libdispatch-manager
    frame #0: 0x386cc838 libsystem_kernel.dylib'kevent64+24
    frame #1: 0x3861b0d4 libdispatch.dylib'<redacted>+232
    frame #2: 0x38615622 libdispatch.dylib'<redacted>+38
thread #6: tid 0x82cc5, 0x386cca84 libsystem_kernel.dylib'mach_msg_trap+20
    frame #0: 0x386cca84 libsystem_kernel.dylib'mach_msg_trap+20
    frame #1: 0x386cc880 libsystem_kernel.dylib'mach_msg+40
    frame #2: 0x2d953558 CoreFoundation'<redacted>+156
    frame #3: 0x2d951c78 CoreFoundation'<redacted>+792
    frame #4: 0x2d8bc470 CoreFoundation'CFRunLoopRunSpecific+524
    frame #5: 0x2d8bc252 CoreFoundation'CFRunLoopRunInMode+106
    frame #6: 0x2e2aa696 Foundation'<redacted>+254
    frame #7: 0x005f0b46 Example'-[PXNetworkManager networkRunLoopThreadEntry]+758
    frame #8: 0x2e36cc36 Foundation'<redacted>+1062
    frame #9: 0x38745c5c libsystem_pthread.dylib'<redacted>+140
    frame #10: 0x38745bce libsystem_pthread.dylib'_pthread_start+102
    frame #11: 0x38743cd libsystem_pthread.dylib'thread_start+8
thread #9: tid=0x82cd0, 0x386cca84 libsystem_kernel.dylib'mach_msg_trap+20, name='com.apple.NSURLConnectionLoader
    frame #0: 0x386cca84 libsystem_kernel.dylib'mach_msg_trap+20
    frame #1: 0x386cc880 libsystem_kernel.dylib'mach_msg+40
    frame #2: 0x2d953558 CoreFoundation'<redacted>+156
    frame #3: 0x2d951c78 CoreFoundation'<redacted>+792
    frame #4: 0x2d8bc470 CoreFoundation'CFRunLoopRunSpecific+524

```
        frame          #5:          0x2d8bc252
    CoreFoundation'CFRunLoopRunInMode+106
    frame #6: 0x2e2f74c0 Foundation'<redacted>+320
    frame #7: 0x2e36cc36 Foundation'<redacted>+1062
        frame          #8:          0x38745c5c
    libsystem_pthread.dylib'<redacted>+140
    frame    #9:    0x38745bce    libsystem_pthread.dylib.
    pthread_start+102
thread         #11:        tid=0x82cd5,        0x386cca84
libsystem_kernel.dylib'mach_msg_trap+20
        frame          #0:          0x386cca84
    libsystem_kernel.dylib'mach_msg_trap+20
        frame          #1:          0x386cc880
    libsystem_kernel.dylib'mach_msg+40
    frame #2: 0x2d953558 CoreFoundation'<redacted>+156
    frame #3; 0x2d951c78 CoreFoundation'<redacted>+792
        frame          #4:          0x2d8bc470
    CoreFoundation'CFRunLoopRunSpecific+524
        frame          #5:          0x2d9000da
    CoreFoundation'CFRunLoopRun+98
    frame    #6:    0x2df74368    CoreMotion'___
    IIdb_unnamed_function1407$$CoreMotion+728
        frame          #7:          0x38745c5c
    libsystem_pthread.dylib'<redacted>+140
    frame   #8:   0x38745bce   libsystem_pthread.dylib'_
    pthread_start+102
thread          #12:         tid=0x82cdc,         0x386df440
libsystem_kernel.dylib'select$DARWIN_EXTSN+20,
name='com.apple.CFSocket.private
        frame          #0:          0x386df440
    libsystem_kernel.dylib'select$DARWIN_EXTSN +20
    frame #1: 0x2d95745a CoreFoundation'<redacted>+486
        frame          #2:          0x38745c5c
    libsystem_pthread.dylib'<redacted>+140
    frame   #3:   0x38745bce   libsystem_pthread.dylib'_
    pthread_start+102
thread   #14:   tid=0x82d0f   0x386dfc7c   libsystem_ker-
nel.dylib'_workq_kernreturn+8
    frame #0: 0x386dfc7c libsystem_kernel.dylib'_workq_k-
    ernreturn+8
    frame   #1:   0x38743e0   a   libsystem_pthread.dylib'_
    pthread_wqthread+310
thread   #15:   tid=0x82d10,   0x386dfc7c:   libsystem_ker-
nel.dylib'_workq_kernreturn+8
    frame #0: 0x386dfc7c libsystem_kernel.dylib'_workq_k-
    ernreturn+8
    frame    #1:    0x38743e0a    libsystem_pthread.dylib'_
    pthread_wqthread+310
thread          #16:         tid=0x82d12,         0x386cca84
libsystem_kernel.dylib'mach_msg_trap+20, name ='WebT-
hread
        frame          #0:          0x386cca84
    libsystem_kernel.dylib'mach_msg_trap+20
        frame          #1:          0x386cc880
    libsystem_kernel.dylib'mach_msg+40
    frame #2: 0x2d953558 CoreFoundation'<redacted>+156
    frame #3: 0x2d951c78 CoreFoundation'<redacted>+792
        frame          #4:          0x2d8bc470
    CoreFoundation'CFRunLoopRunSpecific+524
        frame          #5:          0x2d8bc252
    CoreFoundation'CFRunLoopRunInMode+106
    frame #6: 0x35aec0c4 WebCore'<redacted>+420
        frame          #7:          0x38745c5c
    libsystem_pthread.dylib'<redacted>+140
    frame   #8:   0x38745bce   libsystem_pthread.dylib'_
    pthread_start+102
thread   #17:   tid=0x82d17,   0x386dfc7c   libsystem_ker-
nel.dylib'_workq_kernreturn+8
    frame  #0:   0386dfc  libsystem_kernel.dylib'_workq_k-
    ernreturn+8
    frame #1: 0x38743e0a libsystem_pthread.dylib'_pthread-
    _wqthread+310
thread   #18:   tid=0x82d1b   0x386dfc7   libsystem_kernal.
dylib'_workq_kernreturn+8
    frame #0: 0x386dfc7c libsystem_kernel.dylib'_workq_k-
    ernreturn+8
        frame          #1:          0x38743e0a
    libsystem_pthread.dylib'pthread_wqthread+310
(IIdb) process continue
Process 8212 resuming
(IIdb)
```

Although the code examples and output example above illustrate implementations that employ particular algorithms and particular programming languages, implementations are not limited to these examples. Implementations may employ any coding paradigms, coding patterns, programming languages, or algorithms. Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A method, comprising:
   establishing a communication session using a debug module executing on a host device, wherein the host device comprises a shared memory that is accessible to at least the host device and an analysis server;
   employing the communication session to instruct the debug module for:
      loading an application on the host device;
      setting one or more breakpoints to pause execution of the application; and
      executing the application on the host device; and
   providing debug output information to at least the analysis server generated by the debug module using the shared memory, the debug output information collected by the debug module while the execution of the application is paused according to the one or more breakpoints, the debug output information describing a value of at least one variable included in the application.

2. The method of claim 1, wherein providing the debug output information comprises providing the debug output information in a file stored on the shared memory.

3. The method of claim 1, further comprising:
   instructing a daemon on the host device to execute the debug module, and wherein the daemon is associated with an operating system of the host device.

4. The method of claim 1, wherein executing the application comprises:
   providing an application identifier to the debug module, wherein the application identifier is determined after installing the application on the host device;
   determining a path locating the application based on the application identifier using the debug module; and
   executing the application based on the path locating the application using the debug module.

5. The method of claim 1, wherein the debug module is configured to execute without administrative access on the host device.

6. The method of claim 1, wherein the one or more breakpoints are set at one or more locations in the application.

7. A device, comprising:
   at least one memory storing computer-executable instructions, wherein the at least one memory comprise a shared memory this is accessible to at least the device and an analysis server; and
   at least one processor in communication with the at least one memory, the at least one processor configured to access the at least one memory and execute the computer-executable instructions to:
      establish a communication session using debug module of the device;
      employ the communication session to instruct the debug module to:
         load an application on the device;
         set one or more breakpoints to pause execution of the application;
         execute the application on the device;
      provide debug output information to at least the analysis server generated by the debug module using the shared memory, the debug output information collected by the debug module while the execution of the application is paused according to the one or more breakpoints, the debug output information describing a value of at least one variable included in the application.

8. The device of claim 7, wherein providing the debug output information comprises providing the debug output information in a file stored on the shared memory.

9. The device of claim 7, wherein the computer-executable instructions are further configured to:
   instruct a daemon on the device to execute the debug module, wherein the daemon is associated with an operating system of the device.

10. The device of claim 7, wherein executing the application comprises:
    providing an application identifier to the debug module, wherein the application identifier is determined after installing the application on the host device;
    determining a path locating the application based on the application identifier using the debug module; and
    executing the application based on the path locating the application using the debug module.

11. The system device of claim 7, wherein executing the debug module comprises:
    determining a port number of a port for communicating with the remote debug module.

12. The device of claim 7, wherein the one or more breakpoints are set at one or more locations in the application.

13. The device of claim 7, wherein the debug output information further comprises one or more of:
    a value of a program counter of the application when the application is paused;
    a value of a register of the device; and
    information describing a state of the application when the application crashes.

14. One or more non-transitory computer-readable media storing instructions that, when executed by at least one processor of a host device, instruct the host device at to perform actions comprising:
    establishing a communication session using a debug module executing on the host device, wherein the host device comprises a shared memory that is accessible to at least the host device and a remote computing device;
    employing the communication session to receive, at the debug module, one or more commands causing the debug module to:
       load an application on the host device;
       set one or more breakpoints to pause execution of the application; and
       execute the application on the host device; and
       providing debug output information to at least the remote computing device generated by the debug module using the shared memory, the debug output information collected by the debug module while the execution of the application is paused according to the one or more breakpoints, the debug output information describing a value of at least one variable included in the application.

15. The one or more non-transitory computer-readable media of claim 14, providing the debug output information comprises providing the debug output information in a file stored on the shared memory.

16. The one or more non-transitory computer-readable media of claim 14, wherein the actions further comprise:
    employing a daemon to execute the debug module on the host device, the daemon executing on the host device, wherein the daemon is associated with an operating system of the host device.

17. The one or more non-transitory computer-readable media of claim 14, wherein executing the application comprises:
provariding an application identifier to the debug module, wherein the application identifier is determined after installing the application on the host device;
determining a path locating the application based on the application identifier using the debug module; and
executing the application based on the path locating the application using the debug module.

18. The one or more non-transitory computer-readable media of claim 14, wherein establishing the communication session comprises:
determining a port number of a port for the communication session.

19. The one or more non-transitory computer-readable media of claim 14, wherein the one or more breakpoints are set at one or more locations in the application.

20. The one or more non-transitory computer-readable media of claim 14, wherein the debug output information further comprises one or more of:
a value of a program counter of the application when the application is paused;
a value of a register of a processor of the host device; and
information describing a state of the application when the application crashes.

* * * * *